US008955498B2

(12) United States Patent
Kerns et al.

(10) Patent No.: US 8,955,498 B2
(45) Date of Patent: Feb. 17, 2015

(54) VARIABLE VALVE TIMING FOR EGR CONTROL

(75) Inventors: James Michael Kerns, Trenton, MI (US); Stephen B. Smith, Livonia, MI (US); Adam Nathan Banker, Plymouth, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 13/557,059

(22) Filed: Jul. 24, 2012

(65) Prior Publication Data

US 2014/0026872 A1    Jan. 30, 2014

(51) Int. Cl.
*F02M 25/07* (2006.01)
*F02B 47/08* (2006.01)

(52) U.S. Cl.
CPC ............... *F02M 25/07* (2013.01); *F02B 47/08* (2013.01)
USPC ....................... 123/568.11; 123/481; 701/108

(58) Field of Classification Search
USPC ........... 123/568.11, 481, 198 F, 90.15–90.18, 123/698, 704, 325, 332, 346–348; 701/108, 701/112; 60/278, 285
See application file for complete search history.

(56) References Cited

U.S. PATENT DOCUMENTS

| 5,934,263 | A | * | 8/1999 | Russ et al. ..................... 123/698 |
| 6,332,446 | B1 | | 12/2001 | Matsumoto et al. |
| 6,431,154 | B1 | | 8/2002 | Inoue |
| 6,729,126 | B2 | | 5/2004 | Ogiso et al. |
| 7,004,148 | B2 | | 2/2006 | Yokoi et al. |
| 7,025,033 | B2 | | 4/2006 | Foelsche |
| 7,487,750 | B2 | | 2/2009 | Leone et al. |
| 7,779,823 | B2 | | 8/2010 | Winstead |
| 7,962,276 | B2 | | 6/2011 | Turner et al. |
| 2003/0131587 | A1 | * | 7/2003 | Kawamura ...................... 60/276 |
| 2003/0172900 | A1 | * | 9/2003 | Boyer et al. ............... 123/198 F |
| 2004/0040287 | A1 | * | 3/2004 | Beutel et al. ..................... 60/285 |
| 2007/0214775 | A1 | * | 9/2007 | I et al. ............................. 60/288 |
| 2009/0013969 | A1 | * | 1/2009 | Winstead ...................... 123/481 |

OTHER PUBLICATIONS

Kerns, James Michael et al., "Variable Valve Timing for Cylinder Deactivation," U.S. Appl. No. 13/557,101, filed Jul. 24, 2012, 66 pages.

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

Methods and systems are provided for adjusting cylinder valve timings to enable a group of cylinders to operate and combust while another group of cylinders on a second are selectively deactivated. Valve timing may be adjusted to allow flow of air through the inactive cylinders to be reduced, lowering catalyst regeneration requirements upon reactivation. The valve timing may alternatively be adjusted to enable exhaust gas to be recirculated to the active cylinders via the inactive cylinders, providing cooled EGR benefits.

20 Claims, 8 Drawing Sheets

VARIABLE VALVE TIMING FOR EGR CONTROL

TECHNICAL FIELD

This application relates to varying a valve timing to achieve virtual cylinder deactivation and selectively enable reverse flow through a deactivated cylinder bank to achieve EGR benefits.

BACKGROUND AND SUMMARY

Engines may be operated with variable valve timing control to improve engine performance. For example, intake and/or exhaust valve timings may be adjusted (e.g., advanced or retarded) based on engine operating conditions to increase positive valve overlap. The increased valve overlap may then be used for improving air-fuel mixing, cylinder charge temperature control, etc. During still other conditions, the valve timings may be adjusted to increase negative valve overlap.

One example approach for controlling an engine variable valve timing device is shown by Winstead in U.S. Pat. No. 7,779,823. Therein, a valve timing of a first engine cylinder is adjusted to flow gases from the engine intake to the engine exhaust while a valve timing of a second cylinder on the same bank is adjusted to return combusted exhaust gases back to the intake. In this way, a timing of an auto-ignition combustion in the engine (e.g., when operating in an HCCI mode) can be controlled.

However, the inventors herein have identified potential issues with such an approach. As one example, cooled EGR may not be achieved. Specifically, since exhaust gases are returned via one or more cylinders of the same bank, the returned exhaust gas may be at a substantially high temperature. While this may help expedite cylinder heating while the engine is in a HCCI combustion mode, during a spark ignition combustion mode, the higher temperature recycled exhaust gases can lead to misfires and other abnormal combustion events in the combusting cylinders. As such, this may degrade engine performance.

Thus in one example, some of the above issues may be addressed by a method of operating an engine comprising operating a first group of cylinders on a first engine bank to provide a net flow of air and exhaust gas from a first intake manifold to a first exhaust manifold while operating a second group of cylinders on a second engine bank to provide a net flow of exhaust gas from a second exhaust manifold to a second intake manifold. In this way, fuel may be combusted on a first activated bank of cylinders while exhaust gas is recirculated via a second deactivated bank of cylinders.

For example, an engine may include a first group of cylinders coupled to a first exhaust catalyst on a first engine bank and a second group of cylinders coupled to a second exhaust catalyst on a second engine bank. During selected conditions, such as when an engine load is lower than a threshold, fuel may be injected to, and combusted in, the first group of cylinders. In addition, a valve timing of the first group of cylinders may be adjusted so as to flow air and exhaust gas from an intake manifold towards an exhaust junction through the first exhaust catalyst. At the same time, no fuel may be injected to the second group of cylinders. Instead, a valve timing of the second group of cylinders may be adjusted so as to recirculate at least some exhaust gas from the exhaust junction to the intake manifold via the second group of cylinders. That is, flow through the second bank may be in a direction opposite from the flow through the first bank. As such, the exhaust gas may be cooled as it passages through the cylinders of the deactivated bank, thereby providing cooled EGR. Optionally, an exhaust air-to-fuel ratio at a position between the second exhaust catalyst and the exhaust junction may be monitored to identify the presence of exhaust leaks.

Additionally, temporary enrichment of the exhaust generated at the first group of cylinders may be advantageously used to at least partially regenerate the second catalyst coupled to the second group of cylinders. This reduces the fuel required to regenerate the catalyst upon subsequent cylinder reactivation.

In this way, combusted exhaust gas generated on a first engine bank may be recirculated via a second, different engine bank. By reversing flow through cylinders of a deactivated bank, the recirculated exhaust gas may be cooled. Overall, cylinder deactivation and cooled EGR benefits can be simultaneously provided to improve engine performance. By using the reverse flow to detect exhaust leaks, exhaust degradation may also be diagnosed concomitantly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for adjusting intake and/or exhaust valve timing for a first group of cylinders on a first engine bank and a second group of cylinders on a second engine bank (FIGS. 1-3) to enable selective cylinder deactivation. A controller may be configured to perform control routines, such as those shown at FIGS. 4-6, to direct substantially less flow, in the same direction, through an inactive bank as compared to an active bank during some operating conditions. During other conditions, the controller may direct combusted exhaust gas from the active bank through the inactive bank, in the opposite direction. As shown at FIG. 7, the controller may also detect exhaust leaks in the inactive bank during the reversed flow based on changes in monitored air-to-fuel ratio. By adjusting the valve timing of the inactive bank based on an exhaust air-to-fuel ratio of the inactive bank, cylinder deactivation benefits may be achieved while maintaining conditions for exhaust catalyst function. Example adjustments are described herein with reference to FIGS. 8-9.

Figure 1:
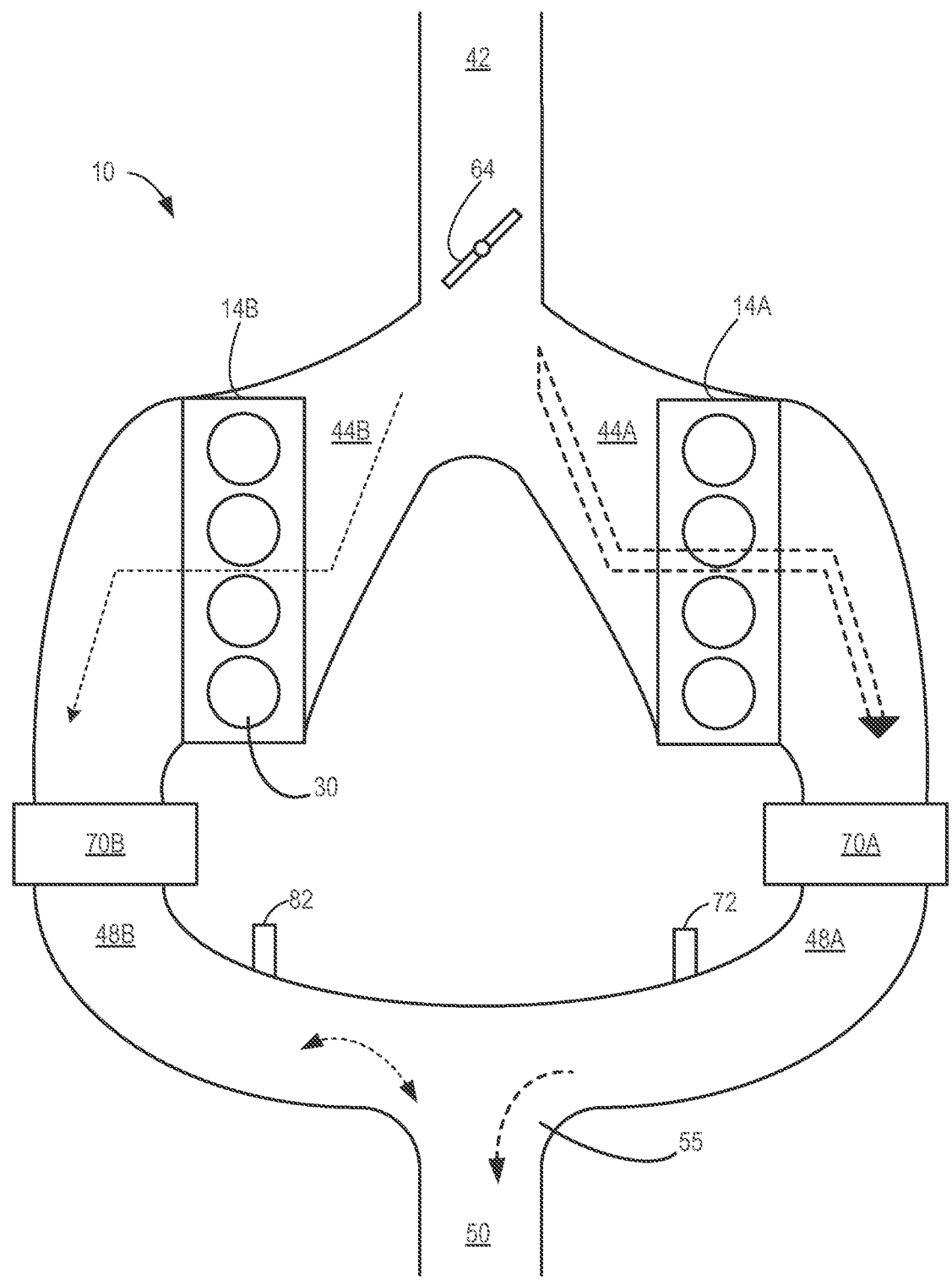
FIGS. 1-2 schematically show aspects of an example engine system in accordance with an embodiment of this disclosure.

FIG. 1 shows an example engine 10 including a plurality of combustion chambers or cylinders 30. The plurality of cylinders 30 of engine 10 are arranged as groups of cylinders on distinct engine banks. In the depicted example, engine 10 includes two engine banks 14A, 14B. Thus, the cylinders are arranged as a first group of cylinders arranged on first engine bank 14A and a second group of cylinders arranged on second engine bank 14B.

Engine 10 can receive intake air via an intake passage 42 communicating with branched intake manifold 44A, 44B. Specifically, first engine bank 14A receives intake air from intake passage 42 via first intake manifold 44A while second engine bank 14B receives intake air from intake passage 42 via second intake manifold 44B. While engine banks 14A, 14B are shown with distinct intake manifolds, it will be appreciated that in alternate embodiments, they may share a common intake manifold or a portion of a common intake manifold. The amount of air supplied to the cylinders of the engine can be controlled by adjusting a position of throttle 64. Additionally, as elaborated herein, an amount of air supplied to each group of cylinders on the specific banks can be adjusted by varying an intake valve timing of one or more intake valves coupled to the cylinders, which are shown in greater detail in FIG. 3.

Combustion products generated at the cylinders of first engine bank 14A are exhausted to the atmosphere via first exhaust manifold 48A. A first emission control device, such as first exhaust catalyst 70A is coupled to first exhaust manifold 48A. Exhaust gas is directed from first engine bank 14A through first exhaust catalyst 70A towards exhaust junction 55 along first exhaust manifold 48A. From there, the exhaust can be directed to the atmosphere via common exhaust passage 50. Likewise, combustion products generated at the cylinders of second engine bank 14B are exhausted to the atmosphere via second exhaust manifold 48B. A second emission control device, such as second exhaust catalyst 70B is coupled to second exhaust manifold 48B. Exhaust gas is directed from second engine bank 14B through second exhaust catalyst 70B towards exhaust junction 55 along second exhaust manifold 48B. From there, the exhaust can be directed to the atmosphere via common exhaust passage 50.

As elaborated below, by adjusting cam timings, cylinder valve timings can be adjusted to provide virtual cylinder deactivation wherein flow through the cylinder is reduced. For example, substantially zero flow through the second bank can be provided. As an example, when the cam timing is such that the intake and exhaust opening center on approximately the bottom of the piston travel, gases (intake air and/or exhaust gas) can flow in and out of the cylinder with a minimal net flow between the intake and the exhaust manifolds. However, during such conditions, minor variations in cam timing, exhaust pressure and intake pressure can result in at least some net flow between the intake and the exhaust manifolds. If the net flow is from the intake to the exhaust system, excess oxygen is introduced into the exhaust catalyst which reduces the NOx conversion efficiency of the catalyst when the cylinders are reactivated, and which leads to a need for excess fuel to be introduced for catalyst regeneration. This reduces overall VDE gains. On the converse, reversed flow from the active bank to the inactive bank may be used during conditions where cooled EGR is desired. During other times, the reverse flow can compromise power output and fuel efficiency. Thus, a desired amount and direction of flow through the inactive bank can be monitored and maintained by adjusting the cam timing, or cylinder valve timing, based on an exhaust air-to-fuel ratio.

For example, during selected engine conditions, such as during low engine loads, one or more cylinders of a selected engine bank may be selectively deactivated. This may include deactivating fuel and spark on the selected engine bank. In addition, an intake and/or exhaust valve timing may be adjusted so as to provide substantially less flow through the inactive engine bank as compared to the active engine bank. A direction of the substantially less flow may be constantly adjusted, e.g., alternated, such that substantially zero flow is enabled through the inactive bank. For example, an intake and/or exhaust valve timing of the inactive engine bank may be continually adjusted based on an exhaust air-to-fuel ratio of the inactive engine bank to provide substantially no net flow through the inactive bank while an intake and/or exhaust valve timing of the active engine bank is adjusted to provide a zero flow (or no net flow) of air and exhaust gas through the active bank. Operating the second group of non-combusting cylinders on the second bank with valve timing adjusted to provide substantially no flow of charge may include, in response to the exhaust air-to-fuel ratio sensed at the second bank being leaner than stoichiometry, adjusting the valve timing to a first timing to reduce flow of charge from the second intake manifold to the second exhaust manifold, and in response to the exhaust air-to-fuel ratio sensed at the second bank being at stoichiometry, adjusting the valve timing to a second timing to reduce flow of charge from the second exhaust manifold to the second intake manifold. Herein, by providing substantially less flow through the inactive bank, cylinder deactivation benefits may be provided without degrading efficiency of the exhaust catalyst on the inactive bank (e.g., via retention of oxygen on the exhaust catalyst), thereby reducing the need for active regeneration of the exhaust catalyst during subsequent cylinder reactivation. This reduces the resultant fuel penalty and improves overall engine fuel economy.

Figure 4:
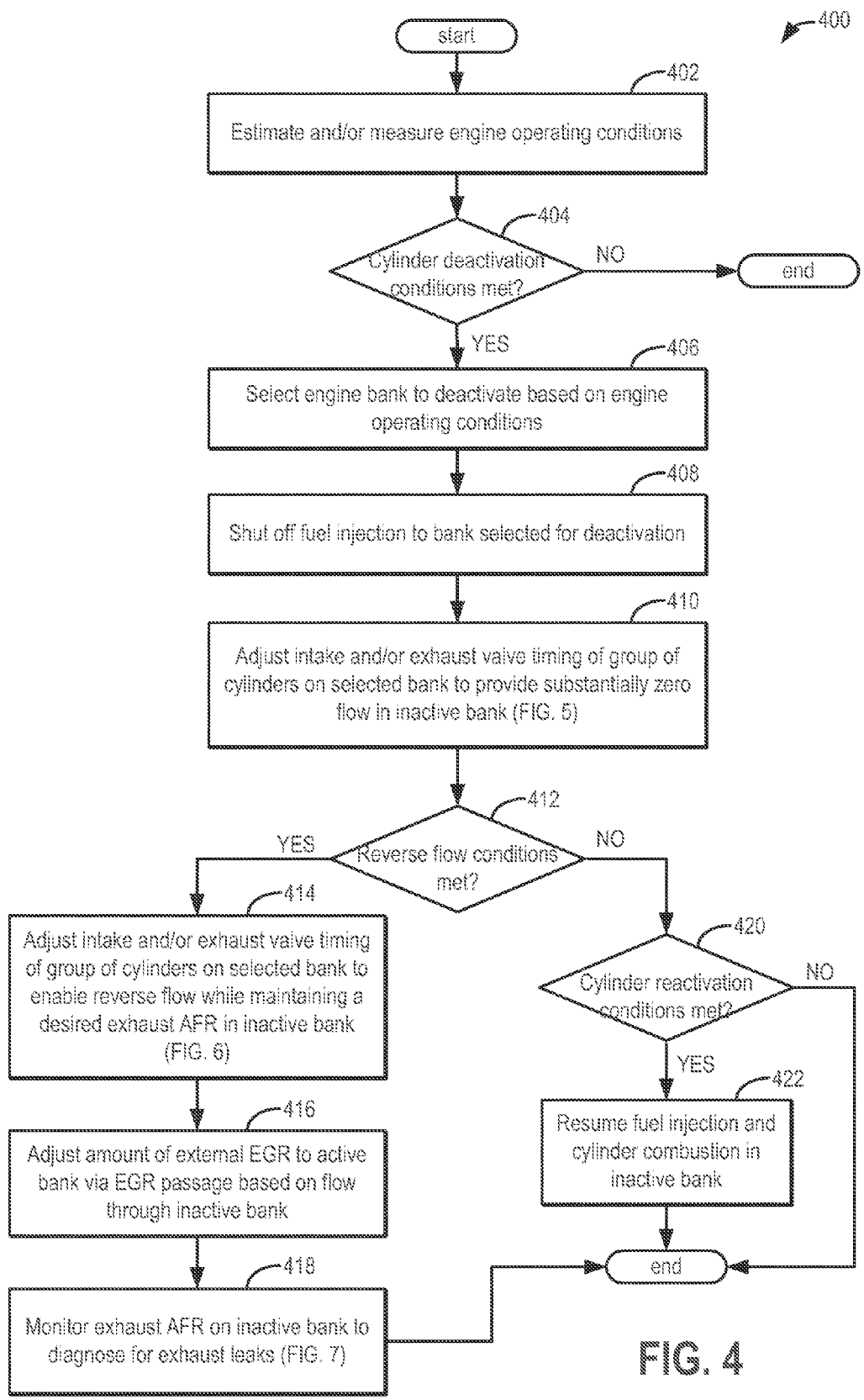
FIGS. 4-6 illustrate example methods for adjusting intake and/or exhaust valve timing for each of a first group and second group of cylinders to reduce flow, or reverse flow, through a deactivated engine bank.
Figure 5:
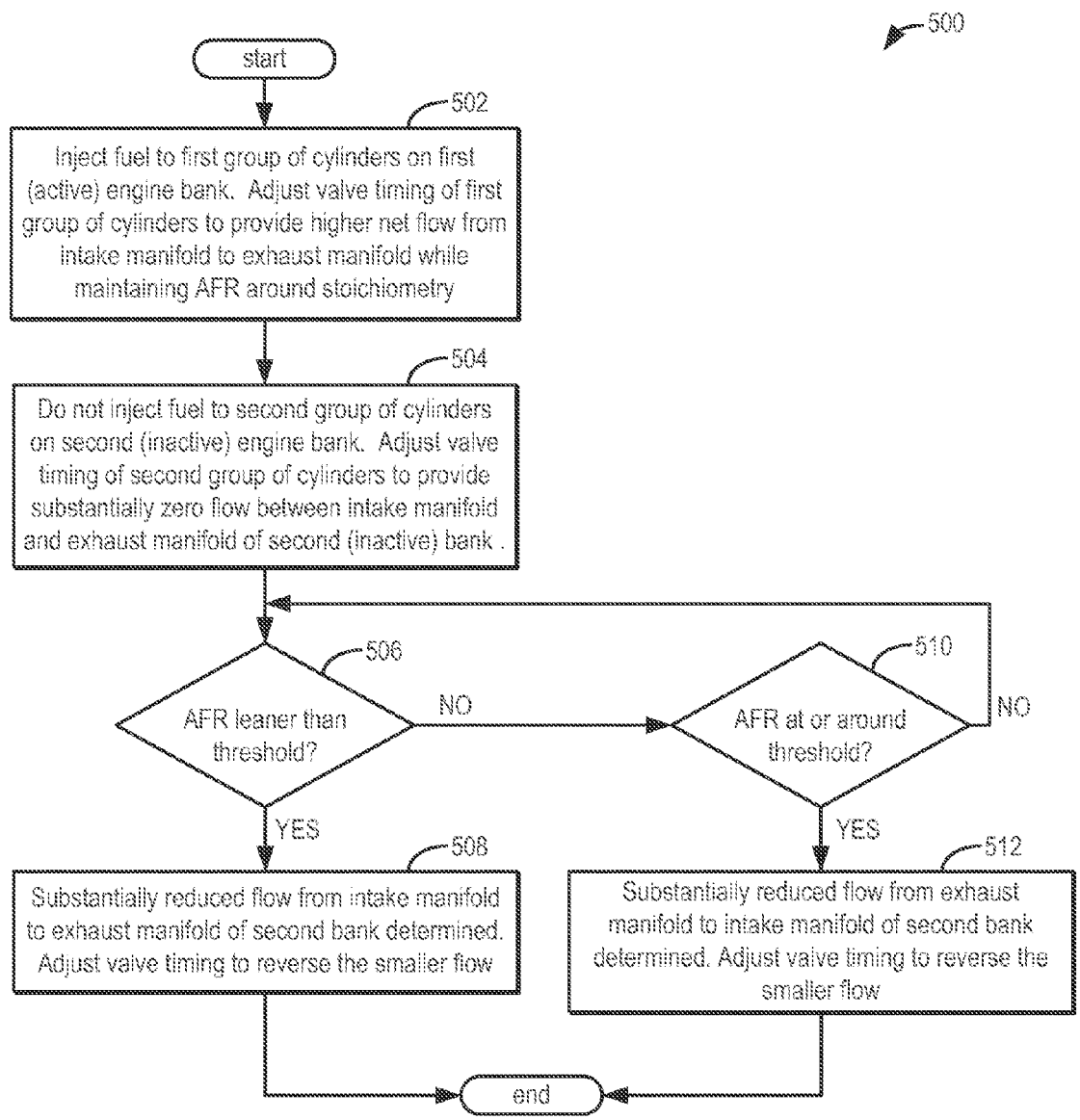

As elaborated at FIGS. 4-5, the valve timing of the inactive bank may be adjusted based on an exhaust air-to-fuel ratio of the inactive bank to provide reduced flow to maintain an air-to-fuel ratio of the inactive bank slightly lean. For example, the valve timing of inactive second engine bank 14B may be adjusted based on the output of second exhaust air-to-fuel ratio sensor 82 to provide substantially no flow by maintaining the exhaust air-to-fuel ratio of the bank slightly leaner than stoichiometry. Alternatively, the valve timing may be adjusted to maintain the exhaust air-to-fuel ratio of inactive engine bank 14B slightly leaner than an exhaust air-to-fuel ratio of active engine bank 14A (e.g., leaner by less than 10%). The exhaust air-to-fuel ratio of first engine bank 14A may be estimated by first exhaust air-to-fuel ratio sensor 72. As such, sensors 72, 82 may be oxygen sensors (such as EGO, HEGO, or UEG sensors) or other appropriate air-to-fuel ratio sensors. In one example, operating the second group of non-combusting cylinders on the second bank with valve timing adjusted to provide substantially no flow of charge includes, in response to the exhaust air-to-fuel ratio sensed at the second bank being leaner than stoichiometry, adjusting the valve timing to a first timing to reduce flow of charge from the second intake manifold to the second exhaust manifold, and in response to the exhaust air-to-fuel ratio sensed at the second bank being at stoichiometry, adjusting the valve timing to a second timing to reduce flow of charge from the second exhaust manifold to the second intake manifold.

Figure 2:
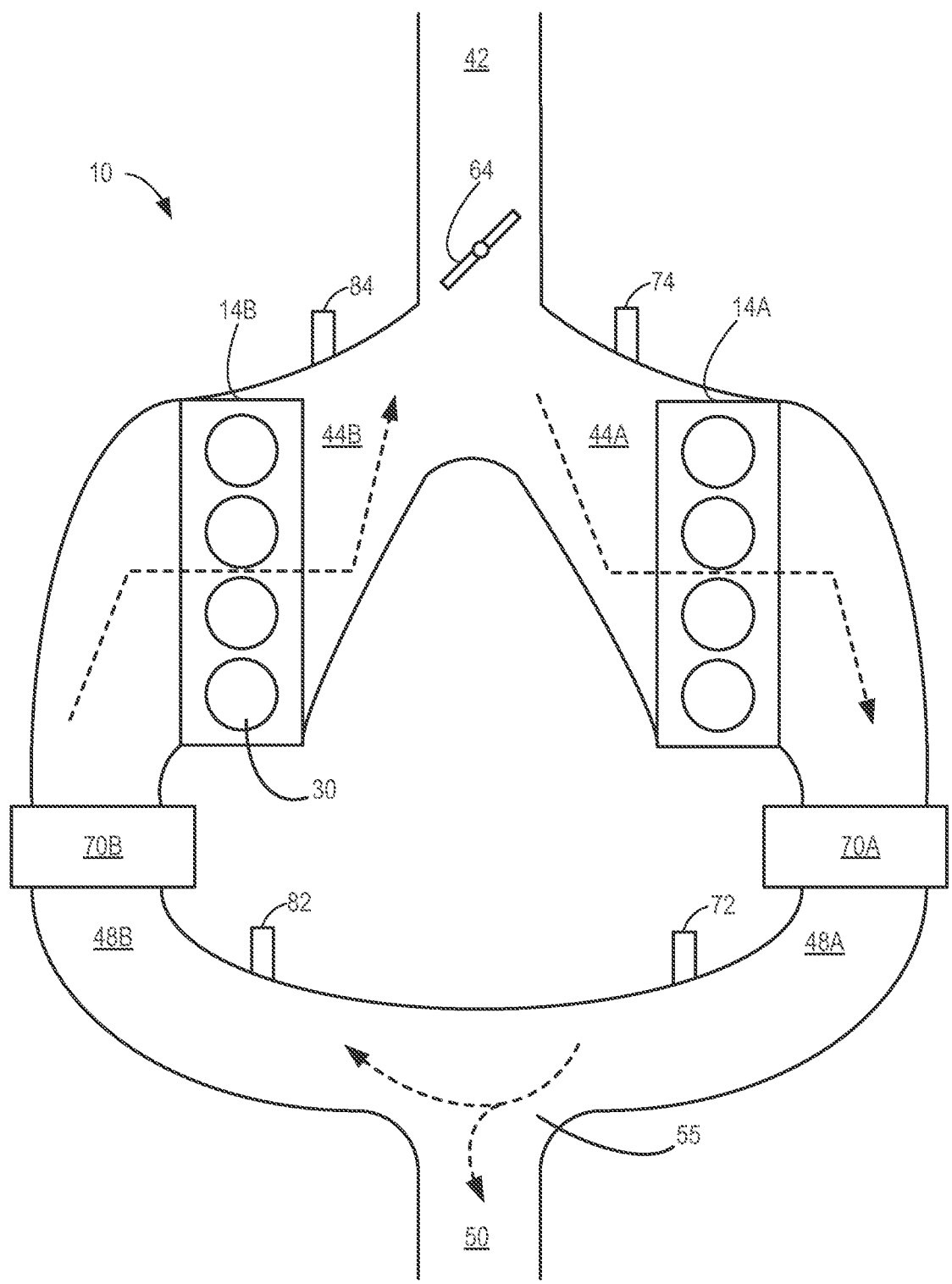
Figure 3:
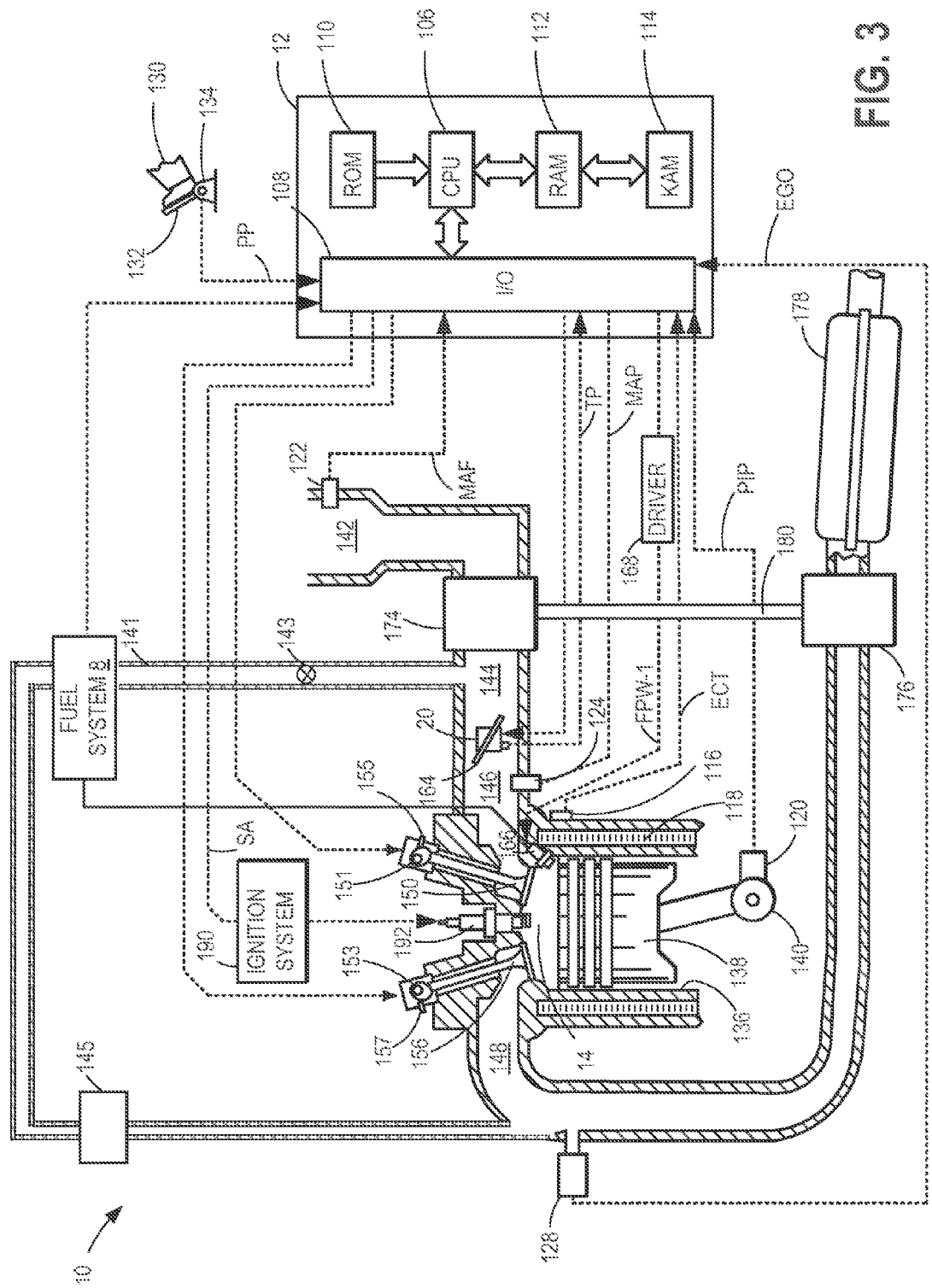
FIG. 3 depicts a partial engine view.

During still other conditions, such as during low engine loads when exhaust gas recirculation is requested, one or more cylinders of a selected engine bank may be selectively deactivated and additionally, an intake and/or exhaust valve timing of the inactive bank may be adjusted to provide a net flow through the inactive bank in a direction opposite to the net flow through the active bank. For example, as shown in FIG. 2, second engine bank 14B may be deactivated by deactivating fuel and spark to the selected engine bank. Then, an intake and/or exhaust valve timing of inactive engine bank 14B may be adjusted so that at least a portion of combusted exhaust gas generated at active engine bank 14A is drawn from the first exhaust manifold 48A into the second exhaust manifold 48B upstream of exhaust junction 55. Further, the combusted exhaust gas is drawn from the second exhaust manifold 48B into second intake manifold 44B, via second catalyst 70B. Thus, the first group of cylinders of first engine bank 14A are operated to provide a net flow of air and exhaust gas from first intake manifold 44A to first exhaust manifold 48A while the second group of cylinders of second engine bank 14B are operated to provide a net flow of exhaust gas from second exhaust manifold 48B to second intake manifold 44B. As the exhaust gas travels through the cylinders of the inactive bank, exhaust gas cooling may occur such that recirculated exhaust gas received via the inactive bank is cooler than exhaust gas received via a dedicated EGR passage. Herein, by drawing a reverse flow through the inactive bank, cooled EGR benefits may be provided in addition to the cylinder deactivation benefits. It will be appreciated that in addition to the EGR received via the reverse flow through the inactive bank, additional EGR may be provided to the active engine bank through an EGR passage coupled between the exhaust manifold and the intake manifold (as shown in FIG. 3). For example, a common EGR passage (not shown in FIGS. 1-2) may be coupled from downstream of exhaust junction 55 to upstream of intake manifolds 44A,44B (and downstream of intake throttle 64). However, in some embodiments, each engine bank may have a dedicated EGR passage coupled between the corresponding intake manifold, downstream of the throttle, and the corresponding exhaust manifold, upstream of exhaust junction 55.

Figure 6:
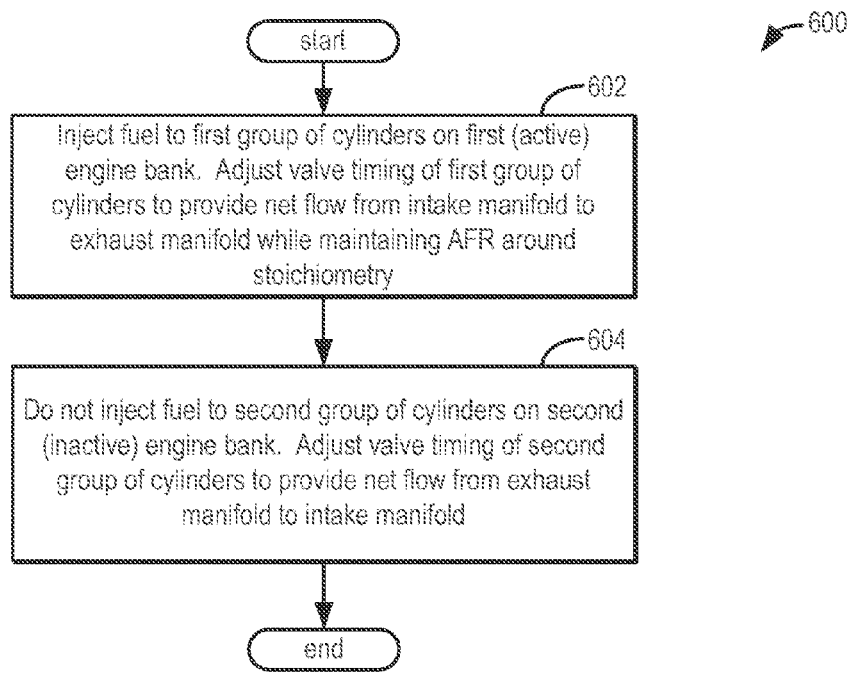
Figure 7:
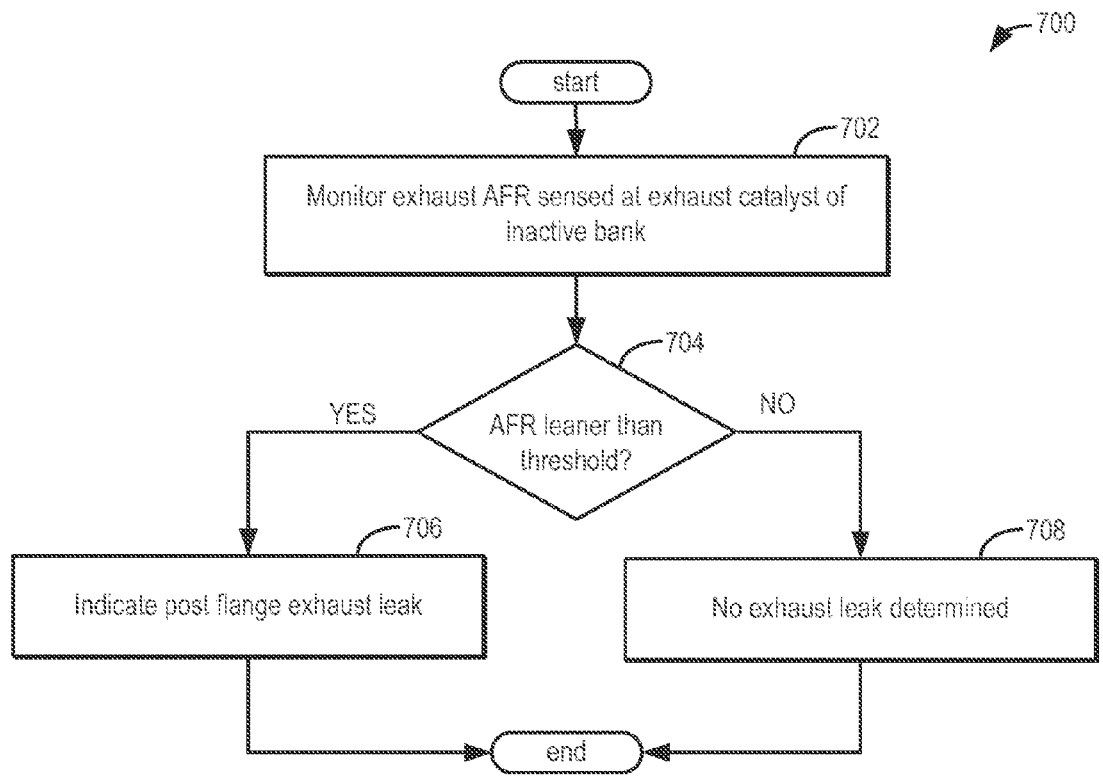
FIG. 7 illustrates an example method for diagnosing an exhaust gas leak in a deactivated engine bank during reverse flow conditions.

As elaborated at FIG. 6, the valve timing of the inactive bank may be adjusted during the reverse flow such that an exhaust air-to-fuel ratio of the active bank is sensed in the intake manifold of the inactive bank. For example, while reversing flow through inactive second engine bank 14B, active engine bank 14A may be operated richer than stoichiometry for a duration. The valve timing of second engine bank 14B may then be adjusted so that the richer than stoichiometry air-to-fuel ratio is sensed at second intake air-to-fuel ratio sensor 84 in second intake manifold 44B. First engine bank 14A may have a similar first intake air-to-fuel ratio sensor 74 in first intake manifold 44A. As such, sensors 74, 84 may be oxygen sensors (such as EGO, HEGO, or UEG sensors) or other appropriate air-to-fuel ratio sensors. By sensing the rich exhaust air-to-fuel ratio of the active bank in the intake of the inactive bank, reverse flow can be confirmed. Additionally, during selected conditions, the first active bank 14A may be temporarily operated richer than stoichiometry for a duration to at least partially regenerate the exhaust catalyst on the second inactive engine bank 14B. Herein, the duration of enrichment and/or degree of enrichment may be based on the regeneration state, or oxygen loading state, of the exhaust catalyst coupled to the inactive bank. For example, the duration may be increased and the richness may be increased as the oxygen loading state of the catalyst increases.

As used herein, adjusting the valve timing of intake and/or and exhaust valve may include adjusting a cam timing where the valves are cam-actuated valves. For example, a camshaft position of a camshaft coupled to the intake and/or exhaust valves of the first bank may be adjusted to a first position to provide a first cam timing and a corresponding first valve timing that provides a net flow in a first direction through the first bank (specifically, from the intake manifold to the exhaust manifold). At the same time, a camshaft position of a camshaft coupled to the intake and/or exhaust valves of the second bank may be adjusted to a second, different position to provide a second, different cam timing and a corresponding second, different valve timing that provides a net flow in a second, opposite direction through the second bank (specifically, from the exhaust manifold to the intake manifold). Alternatively, the second cam timing and the corresponding second valve timing may be constantly adjusted between a timing that provides a small net flow in the first direction through the second bank (specifically, from the intake manifold to the exhaust manifold) while providing a leaner than stoichiometric exhaust air-to-fuel ratio at the second bank, and a timing that provides a small net flow in the second direction through the second bank (specifically, from the exhaust manifold to the intake manifold) while providing a stoichiometric exhaust air-to-fuel ratio at the second bank. The constant alternating between the positions allows a substantially zero net flow to be provided at the second bank while the exhaust air-to-fuel ratio hovers at slightly leaner than stoichiometry.

In this way, based on engine operating conditions, a selected engine bank may be deactivated while a valve timing of the inactive may be adjusted to adjust a flow of air and exhaust gas through the cylinders of the inactive bank. By allowing the flow to be reversed through the inactive bank during some conditions, cooler EGR may be provided while maintaining a performance level of an exhaust catalyst of the inactive bank. By allowing flow through the inactive bank to be substantially reduced during other conditions, cylinder deactivation may be provided while also maintaining the performance level of the exhaust catalyst of the inactive bank and reducing regeneration requirements. In this way, tailpipe exhaust emissions and fuel economy is improved.

It will be appreciated that in some embodiments, the exhaust manifolds may further include a shut-off valve (not shown) coupled upstream of the respective exhaust catalyst so as to reduce flow through the catalyst. For example, during conditions when a first group of cylinders on the first engine bank 14A are deactivated, a first shut-off valve coupled upstream of first exhaust catalyst 70A may be closed to reduce flow there-through. Likewise, during conditions when a second group of cylinders on the second engine bank 14B are deactivated, a second shut-off valve coupled upstream of second exhaust catalyst 70B may be closed to reduce flow there-through. By reducing flow, oxygen saturation of the catalyst coupled to the inactive engine bank can be decreased.

As such, when the shut-off valve is closed, pressure and vacuum may tend to build in the corresponding exhaust manifold. This increase in exhaust manifold pressure would increase the pumping work and reduce the fuel economy benefits achieved via the cylinder deactivation. Thus in some embodiments, a pressure sensor may also be coupled to the exhaust manifold to detect the pressure changes, and the valve timing of the cylinders on the inactive engine bank may be further fine-tuned to hold the exhaust manifold pressure at or around a desired pressure. Alternatively, an oxygen sensor, such as an exhaust UEGO sensor, may be used to infer the pressure of the exhaust manifold since the output voltage of the UEGO sensor is sensitive to air pressure. Accordingly, the valve timing of the inactive engine bank may be adjusted based on the output of the oxygen sensor to maintain the exhaust manifold pressure at the desired value (e.g., at or below a threshold pressure).

FIG. 3 depicts an example embodiment of a combustion chamber or cylinder of internal combustion engine 10 (such as engine 10 of FIGS. 1-2). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 3 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 3, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178 although in some embodiments, exhaust gas sensor 128 may be positioned downstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. For example, in the embodiments of FIGS. 1-2, the intake valves of cylinders on a first bank may be controlled by a common valve actuator while the exhaust valves on the first bank are controlled by a different, common valve actuator. Likewise, the intake valves and exhaust valves of a second bank may have respective common valve actuators.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for delivering fuel. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 3 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that, in an alternate embodiment, injector 166 may be a port injector providing fuel into the intake port upstream of cylinder 14. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as air-charge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 3 shows only one cylinder of a multi-cylinder engine. As such each cylinder may similarly include its own set of intake/exhaust valves, fuel injector(s), spark plug, etc.

Fuel tanks in fuel system 8 may hold fuel with different qualities and compositions. These differences may include different alcohol content, different water content, different octane, different heat of vaporizations, different fuel blends, and/or combinations thereof etc. In one example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Moreover, fuel characteristics of the fuel or knock control fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more pressure, temperature, and concentration of the exhaust gas.

It will be appreciated that while the embodiment of FIG. 3 shows low pressure (LP-EGR) being provided via an LP-EGR passage coupled between the engine intake upstream of the turbocharger compressor and the engine exhaust downstream of the turbine, in alternate embodiments, the engine may be configured to also provide high pressure EGR (HP-EGR) via an HP-EGR passage coupled between the engine intake downstream of the compressor and the engine exhaust upstream of the turbine. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. When distinct HP-EGR and LP-EGR passages are included, the respective EGR flows may be controlled via adjustments to respective EGR valves.

Controller 12 is shown in FIG. 3 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

In this way, the system of FIGS. 1-3 enables a method for an engine wherein a first group of cylinders on a first engine bank is operated to combust and exhaust gases to a catalyst and then to an exhaust junction while operating a second group of cylinders on a second engine bank to draw gases from the exhaust junction, through a second catalyst and then to the intake. The system also enables a method wherein a first group of cylinders on a first engine bank is operated to combust and exhaust gases to a catalyst and then to an exhaust junction while operating a second group of cylinders on a second engine bank to flow air through a second catalyst and then to the exhaust junction, wherein the flow of air through the second engine bank is smaller than the flow of exhaust gases through the first engine bank.

Now turning to FIG. 4, an example method 400 is shown for adjusting engine operation to enable selective cylinder deactivation, and for further adjusting intake and/or exhaust valve timing for various cylinder groups to either reduce flow through deactivated cylinders or reverse flow through the deactivated cylinders.

At 402, the method includes estimating and/or measuring engine operating conditions. These may include, for example, engine speed, desired torque (for example, from a pedal-position sensor), manifold pressure (MAP), manifold air flow (MAF), BP, engine temperature, catalyst temperature, intake temperature, spark timing, boost level, air temperature, knock limits, etc.

At 404, based on the estimated operating conditions, the routine may determine an engine mode of operation (e.g., VDE or non-VDE). In particular, it may be determined if cylinder deactivation conditions have been met. As one example, cylinder deactivation conditions may be confirmed when torque demand is less than a threshold. As such, if cylinder deactivation conditions are not met at 404, the routine may end with the engine operating with all cylinders firing.

At 406, upon confirming cylinder deactivation conditions, the routine includes selecting a group of cylinders and/or an engine bank to deactivate based on the estimated engine operating conditions. The selection may be based on, for example, which group of cylinders were deactivated during a previous VDE mode of operation. For example, if during the previous cylinder deactivation condition, a first group of cylinders on a first engine bank were deactivated, then a controller may select a second group of cylinders on a second engine bank for deactivation during the present VDE mode of operation. As another example, the selection may be based on a regeneration state of a first exhaust catalyst (or emission control device) coupled to the first bank relative to the regeneration state of a second exhaust catalyst (or emission control device) coupled to the second bank.

Following the selection, at 408, the selected group of cylinders may be deactivated. Herein, the deactivation may include selectively turning off fuel injectors of the selected group of cylinders. As elaborated below, the controller may continue to operate (e.g., open or close) intake and exhaust valves of the deactivated cylinders so as to flow air and/or exhaust gases through the deactivated cylinders. In one example, where the engine is a V8 engine, during a VDE mode, the engine may be operated with one group of cylinders activated (that is, in a V4 mode) while during the non-VDE mode, the engine may be operated with both groups of cylinders activated (that is, in a V8 mode).

At 410, the routine includes adjusting intake and/or exhaust valve timing of the deactivated group of cylinders based on the exhaust air-to-fuel ratio of the deactivated bank so as to substantially reduce flow through the selected bank. Optionally, the controller may also maintain a desired exhaust air-to-fuel ratio in the inactive bank. As an example, the engine may include a first bank with a first group of cylinders and a second bank with a second group of cylinders, and the controller may have selected the second group of cylinders for deactivation during the VDE mode. Accordingly, the routine includes operating the first group of cylinders on the first engine bank to provide a net flow of air and exhaust gas in a first direction while adjusting a valve timing of the second group of cylinders on the second engine bank to have substantially less flow through the second bank as compared to the first bank and maintain a desired air-to-fuel ratio at the second bank slightly leaner than stoichiometry (or slightly leaner than the exhaust air-to-fuel ratio of the active bank).

As elaborated at FIG. 5, a direction of flow through the inactive bank may be constantly adjusted (e.g., alternated) based on an exhaust air-to-fuel ratio sensed at the inactive bank so that substantially zero (or negligible) flow through the second engine bank is provided. As such, the substantially less flow through the second engine bank may include a net flow that is a fraction (e.g., less than 10%) of the net flow through the first engine bank and that continually alternates directions between the same direction as flow in the first engine bank and in the opposite direction as flow in the first engine bank. For example, while the first bank is operated at stoichiometry, a leaner than stoichiometry exhaust air-to-fuel ratio at the second bank may be user to infer a small flow of aircharge from the intake manifold to the exhaust manifold. Responsive to the enleanment, the valve timing may be adjusted to reverse flow through the second bank so that a small flow of charge goes from the exhaust manifold to the intake manifold, and the air-to-fuel ratio of the second bank returns to stoichiometry. Then, responsive to the stoichiometric exhaust air-to-fuel ratio at the second bank, a small flow of charge from the exhaust manifold to the intake manifold may be inferred and the valve timing may be adjusted to reverse flow through the second bank so that a small flow of charge goes from the intake manifold to the exhaust manifold, and the air-to-fuel ratio of the second bank is enleaned. In this way, the continuous alternating of a flow direction causes substantially zero net flow to be provided at the second engine bank. In addition, the constant adjustment of flow direction causes the exhaust air-to-fuel ratio at the second engine bank to hover around leaner than stoichiometry.

As such, the net flow through the first engine bank and the second engine bank may be in the same direction (herein, the first direction) during some conditions, and in the opposite direction during other conditions. Specifically, the net flow of air and exhaust gas in the first direction through the first engine bank may include a net flow from a first intake manifold to a first exhaust manifold of the first bank. The substantially less flow in the second bank may be in the first direction, specifically, from a second intake manifold to a second exhaust manifold of the second bank during some conditions, and then alternated to be in the second direction, specifically, from the second exhaust manifold to the second intake manifold of the second bank during other conditions.

It will be appreciated that in some embodiments, where the exhaust manifold includes a shut-off valve coupled upstream of the exhaust catalyst, the controller may also close the shut-off valve to reduce flow of air through the inactive engine bank into the catalyst, thereby reducing oxygen saturation of the exhaust catalyst.

Next at 412, it may be determined if reverse flow conditions have been met. Specifically, it may be determined if engine conditions require flow through the deactivated group of cylinders to be temporarily reversed. As such, reverse flow through cylinders of a deactivated bank can be advantageously used during selected engine conditions to recirculate exhaust gas via the cylinders and provide cooled EGR benefits. This may enable cylinder deactivation and cooled EGR benefits to be simultaneously provided for added engine performance.

In one example, reverse flow conditions may include an increase in EGR requested at the active bank. For example, when EGR requested in the first group of cylinders is higher than a threshold, reverse flow conditions may be confirmed. As another example, reverse flow conditions may be confirmed in response to a request for cooled EGR at the active bank (e.g., cooled EGR being requested in the first group of cylinder). As yet another example, reverse flow conditions may be confirmed after the deactivated engine bank has been operated with reduced flow or substantially no net flow (as at 410) for a duration.

Figure 8:
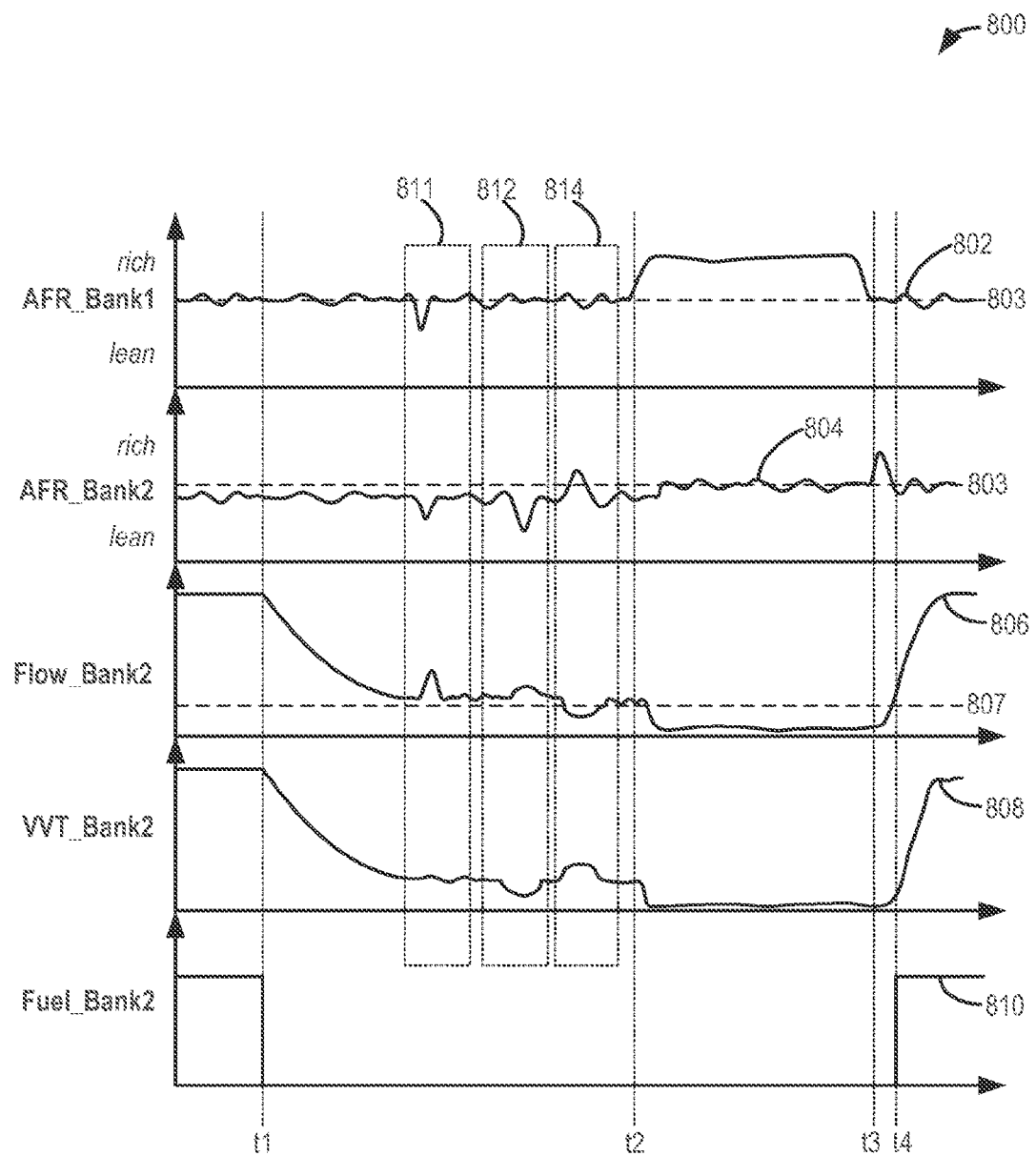
FIG. 8 illustrates example valve timing adjustments to each of a first and second group of cylinders, according to the present disclosure.

Additionally, as elaborated at FIG. 8, reverse flow may be requested if the oxygen content of an exhaust catalyst coupled to the inactive bank is higher than a threshold so that reverse flow of rich exhaust gas can be advantageously used to regenerate (e.g., at least partially regenerate) the exhaust catalyst. As such, this reduces the fuel penalty incurred during subsequent cylinder reactivation.

If reverse flow conditions are met, then at 414, and as elaborated at FIG. 6, the routine includes adjusting intake and/or exhaust valve timings of the deactivated group of cylinders on the selected bank (herein, the second group of cylinders on the second bank) to enable reverse flow through the inactive bank while maintaining a desired exhaust air-tofuel ratio. In the present example, where the second group of cylinders on the second engine bank is selected for deactivation, the controller may operate the first group of cylinders on the first engine bank to provide a net flow of air and exhaust gas from the first intake manifold to the first exhaust manifold while operating the second group of cylinders on the second engine bank to provide a net flow of exhaust gas from the second exhaust manifold to the second intake manifold. As shown at FIGS. 1-2, the first exhaust manifold may be coupled to the second exhaust manifold at a junction located downstream of a first exhaust catalyst of the first bank and a second exhaust catalyst of the second bank.

In particular, the routine includes operating a first group of cylinders on a first engine bank to combust and exhaust gas to a catalyst and then to an exhaust junction, while operating a second group of cylinders on a second engine bank to draw gas from the exhaust junction, through a second catalyst, and then to an intake. As used herein, the intake of the second engine bank may be different from the intake of the first engine bank (as shown at FIGS. 1-2) or the same as the intake of the first engine bank.

Next at 416, the routine includes adjusting an amount of external EGR delivered to the active engine bank based on the reverse flow through the second inactive engine bank. As previously elaborated, by drawing exhaust gas from the exhaust junction of the first and second exhaust manifolds into the intake manifold of the first, inactive bank, exhaust gas may be recirculated via the inactive bank. In addition, the recirculated exhaust gas may be rapidly cooled as it passes through the cylinders of the deactivated engine bank, When the cooled recirculated exhaust gas is then pumped through the first active engine bank, cooled EGR benefits are provided alongside the cylinder deactivation benefits. This reduces the amount of cooled EGR that has to be delivered to the active engine bank via a dedicated EGR passage and dedicated EGR cooler, providing addition fuel economy benefits.

In the present example, the first engine bank may include an EGR passage coupled between the intake and the exhaust, at a point upstream of the exhaust junction, and the controller may adjust an amount of exhaust gas recirculated to the first engine bank via the EGR passage based on an amount of gas drawn from the exhaust junction through the second catalyst of the second engine bank. This allows a total amount of cooled EGR to be maintained. In one example, by providing the reverse flow during conditions when EGR demand is high, EGR provided via reverse flow through the inactive engine bank may be used to supplement EGR provided via an EGR passage so that the elevated EGR demand can be met.

At 418, the reverse flow can be advantageously used to diagnose for exhaust leaks. As elaborated at FIG. 7, the controller may sense and monitor an air-to-fuel ratio in the exhaust manifold of the deactivated engine bank and indicate a leak in the exhaust manifold of the deactivated engine bank based on the monitored air-to-fuel ratio being leaner than a threshold level. With reference to the present example, the controller may indicate a leak in the second exhaust manifold (of the second inactive engine bank) in response to an air-to-fuel ratio sensed between the second exhaust catalyst and the exhaust junction being leaner than a threshold level.

Returning to 412, if reverse flow conditions are not met, the controller may continue to operate the engine with substantially reduced flow through the deactivated engine bank until cylinder reactivation conditions are met at 420. Cylinder reactivation conditions may be confirmed in response to, for example, a driver torque demand being higher than a threshold level (e.g., during a tip-in). As another example, cylinder reactivation conditions may be confirmed after the engine has been operated with cylinder deactivation (that is, in the VDE mode) for a defined duration. The duration may be based on, for example, an oxygen loading state of the exhaust catalyst of the inactive engine bank (herein the second engine bank).

If cylinder reactivation conditions are met, then at 422, the routine includes returning fuel injection and spark ignition to the deactivated engine bank and resuming combustion in the deactivated group of cylinders.

Now turning to FIG. 5, an example routine 500 is shown for adjusting intake and/or exhaust valve timings on a deactivated engine bank to provide a net zero flow through the inactive bank relative to the active bank. The routine of FIG. 5 may be performed as part of the routine of FIG. 4, such as at 410.

At 502, then routine includes operating a first group of cylinders on a first engine bank to provide a net flow of air and exhaust gas in a first direction. The first direction includes a net flow from a first intake manifold to a first exhaust manifold of the first engine bank. A valve timing (e.g., intake and/or exhaust valve timing) of the first group of cylinders may be adjusted to provide a higher net flow of gases (e.g., air and exhaust gases) in the first direction.

Herein, the first engine bank is an active engine bank and operating the first group of cylinders includes injecting fuel to the first group of cylinders. In particular, fuel injection to the first group of cylinders and valve timing of the first group of cylinders may be adjusted to maintain an exhaust air-to-fuel ratio in the first engine bank substantially at stoichiometry. In some embodiments, a controller may also adjust a spark timing of the first group of cylinders based on a valve timing of the second group of cylinders to maintain the exhaust air-to-fuel ratio of the first engine bank and maintain a net brake torque.

At 504, the routine includes adjusting a valve timing of a second group of cylinders on a second engine bank to have substantially no flow in the second bank as compared to the first bank. Optionally, a desired air-to-fuel ratio may be maintained at the second bank. Herein, the second engine bank is an inactive engine bank and no fuel is injected into the second group of cylinders. For example, the second group of cylinders may have selectively deactivatable fuel injectors which are deactivated to operate the engine in a VDE mode (while using the first group of cylinders as the active bank).

The substantially zero flow in the second bank may be provided by continually adjusting a valve timing of the second bank responsive to an exhaust air-to-fuel ratio of the second bank. As elaborated at FIG. 9, the continuous adjustment allows the exhaust air-to-fuel ratio constantly be fluctuated between stoichiometry (or the exhaust air-to-fuel ratio of the first engine bank) and leaner than stoichiometry (or leaner than the exhaust air-to-fuel ratio of the first engine bank) such that the net flow in the second bank is zero and the net exhaust air-to-fuel ratio is slightly leaner than stoichiometry.

As used herein, adjusting the valve timing of the second group of cylinders includes adjusting an intake and/or exhaust valve timing of the second group of cylinders. The valve timing is adjusted, as elaborated below at 506-512, to adjust a flow direction and maintain a desired air-to-fuel ratio at the second engine bank. In particular, the valve timing is adjusted based on an estimated exhaust air-to-fuel ratio of the second bank to maintain the exhaust air-to-fuel ratio of the second bank slightly leaner than an air-to-fuel ratio of the first bank. As one example, the valve timing of the first bank may be adjusted to maintain an exhaust air-to-fuel ratio of the first bank at or around stoichiometry while the valve timing of the second bank may be adjusted to maintain an exhaust air-to-fuel ratio of the second bank slightly leaner than stoichiometry. As another example, the valve timing of the second bank may be adjusted to maintain an exhaust air-to-fuel ratio of the second bank slightly leaner than an exhaust air-to-fuel ratio of the first bank, and in particular, within a range of the exhaust air-to-fuel ratio of the first bank (e.g., at less than 5-10% leaner than the exhaust air-to-fuel ratio of the first bank).

At 506, the exhaust air-to-fuel ratio of the inactive second engine bank may be sensed and it may be determined if the sensed exhaust air-to-fuel ratio is leaner than a threshold. For example, it may be determined if the sensed exhaust air-to-fuel ratio is leaner than stoichiometry or leaner than the exhaust air-to-fuel ratio of the active first engine bank. If yes, then at 508, the controller may infer that there is substantially less flow in a first direction through the second engine bank (specifically in a direction from the intake manifold to the exhaust manifold) than flow in the first direction through the first engine bank. The controller may accordingly adjust the valve timing of the second bank to reverse a direction of the substantially less flow from the first direction to a second direction (specifically to a direction from the exhaust manifold to the intake manifold of the second bank).

If the sensed exhaust air-to-fuel ratio of the second bank is not leaner than the threshold, then at 510 it may be determined if the sensed exhaust air-to-fuel ratio of the second bank is at or around the threshold. For example, it may be determined if the sensed exhaust air-to-fuel ratio is at or around stoichiometry or at or around the exhaust air-to-fuel ratio of the active first engine bank. If yes, then at 512, the controller may infer that there is substantially less flow in a second direction through the second engine bank (specifically in a direction from the exhaust manifold to the intake manifold) than flow in the first direction through the first engine bank. The controller may accordingly adjust the valve timing of the second bank to reverse a direction of the substantially less flow from the second direction to the first direction (specifically to a direction from the intake manifold to the exhaust manifold of the second bank).

Herein, the existing exhaust gas oxygen sensor is used to control the net flow through the inactive group of cylinders. In particular, if a net flow in the inactive engine bank from the intake manifold to the exhaust manifold, the exhaust oxygen sensor will react to the fresh air coming from the intake manifold and indicate a lean air-to-fuel ratio. If the net flow is from the exhaust manifold to the intake manifold, the sensor will continue to detect the air-to-fuel ratio of the exhaust gasses from the other active engine bank (or the air-to-fuel ratio of the exhaust gasses from before the cylinder deactivation, based on the rate of flow and cylinder deactivation time), which is closer to stoichiometry. If the flow in the vicinity of the oxygen sensor is slightly alternating directions, fresh air from the intake mixed with exhaust gasses from the downstream portions of the exhaust system would result in a slightly lean measure value. Thus, by controlling the cam timing of the inactive engine bank as a function of the sensed exhaust air-to-fuel ratio in the inactive engine bank to constantly alternate and adjust a direction of small flow through the inactive engine bank, flow through the inactive bank can be maintained substantially at zero while maintaining the exhaust air-to-fuel ratio of the second bank slightly lean. This reduces the resulting oxygen saturation of the exhaust catalyst on the inactive engine bank, and therefore the regeneration requirement. By reducing the amount of fuel required for regenerating the catalyst, catalytic efficiency and fuel economy is improved.

In some embodiments, the valve timing of the second group of cylinders may be further adjusted based on a pressure of the second exhaust manifold of the second bank. The pressure of the second exhaust manifold may be estimated by a pressure sensor coupled to an exhaust catalyst in the second exhaust manifold. Alternatively, the pressure of the second exhaust manifold may be estimated by an oxygen sensor coupled to an exhaust catalyst in the second exhaust manifold. The adjusting of the valve timing based on the exhaust pressure of the second bank may include adjusting the valve timing to maintain the exhaust pressure of the second bank lower than a threshold pressure. As such, elevated exhaust pressures can lead to increased pumping work and consequently fuel economy losses. Thus, by maintaining the exhaust pressure of the second bank lower than a threshold pressure, pumping work related losses can be reduced.

In one example, where the engine is configured with cam actuation of valves, the intake and/or exhaust valves of the first group of cylinders may be operated by a first cam and the intake and/or exhaust valves of the second group of cylinders may be operated by a second, different cam. Herein, adjusting an intake and/or exhaust valve timing of the second group of cylinders includes adjusting a second cam timing of the second cam while maintaining a first cam timing of the first cam. For example, the first cam timing of the first group of cylinders may be determined based on engine operating conditions (e.g., torque demand) to provide the desired combustion with an exhaust air-to-fuel ratio that is at or around stoichiometry. Upon setting the first cam to a position corresponding to the first cam timing, the first cam position and first cam timing may be maintained. At the same time, the second cam timing may be adjusted (e.g., based on the first cam timing and/or the first exhaust air-to-fuel ratio) to provide substantially zero flow through the second engine bank and to maintain the second exhaust air-to-fuel ratio slightly leaner the first exhaust air-to-fuel ratio. For example, the first bank of combusting cylinder may be operated with a cam timing that provides stoichiometric exhaust air-to-fuel ratios. Then, in response to the exhaust air-to-fuel ratio sensed at the second bank being leaner than stoichiometry, the second cam may be adjusted to a second cam timing that enables reduced flow of charge from the second intake manifold to the second exhaust manifold, and in response to the exhaust air-to-fuel ratio sensed at the second bank being at stoichiometry, adjusting the second cam to a third cam timing that reduces flow of charge from the second exhaust manifold to the second intake manifold.

As such, the correlation between the first and second exhaust air-to-fuel ratios implies that changes in the exhaust air-to-fuel ratio of the first engine bank may affect the exhaust air-to-fuel ratio of the second engine bank as long as there is reduced alternating flow (even if very small) through the second engine bank and as long as the valve timings of the second bank are at the desired settings. For example, if there is a sudden and temporary enrichment of the first exhaust air-to-fuel ratio of the first engine bank, there may be a corresponding sudden and temporary enrichment of the second exhaust air-to-fuel ratio of the second engine bank (e.g., during conditions when flow is from exhaust manifold to intake manifold in second bank). In this case, no further valve timing adjustments of the second bank are required as it indicates that the flow through the second bank is being adjusted based on the flow through the first bank to maintain reduced flow through the second bank relative to the first bank.

If, however, there is no correlation between the exhaust air-to-fuel ratios, further valve timing adjustments may be required on the second engine bank. For example, if there is a sudden and temporary enrichment of the first exhaust air-to-fuel ratio of the first engine bank, but no corresponding enrichment of the second exhaust air-to-fuel ratio of the second engine bank, valve timings of the second bank may need to be readjusted. The lack of correlation between the exhaust air-to-fuel ratios may indicate that the valve timings of the second engine bank have potentially deviated from the desired settings and flow through the second engine is not at the desired reduced flow. Valve timing readjustments are then performed so that flow through the second bank can be returned to a reduced flow through the second bank relative to the first bank.

As one example, an engine controller may operate a first group of combusting cylinders on a first bank with valve timing adjusted to provide a first, higher flow of charge from a first intake manifold to a first exhaust manifold. At the same time, the controller may operate a second group of non-combusting cylinders on a second bank with valve timing adjusted to provide a substantially no flow of charge from a second intake manifold to a second exhaust manifold. The valve timing of the second group of cylinders may be adjusted based on one or more of an exhaust air-to-fuel ratio and an exhaust pressure of the second exhaust manifold. The controller may also adjusting a spark timing of the first group of cylinders based on a valve timing of the second group of cylinders to maintain an exhaust air-to-fuel ratio of the first engine bank and maintain a net brake torque. The intake and/or exhaust valves of the first group of cylinders may be operated via a first camshaft and intake and/or exhaust valves of the second group of cylinders are operated via a second camshaft. Accordingly, the valve timing of the first group of cylinders may be adjusted to a first timing by shifting the first camshaft to a first camshaft position, while a valve timing of the second group of cylinders is continually adjusted between a second, different timing and a third, different timing by continually shifting the second camshaft between a second, different camshaft position enabling reduced flow in a first direction and a third, different camshaft position enabling reduced flow in a second, opposite direction. In this way, the continuous valve adjustments may be used to alternate flow directions of a reduced amount of charge (e.g., air and/or exhaust gas) between an intake and an exhaust manifold of a second group of non-combusting cylinders. This allows substantially no net flow of charge (that is, negligibly small amount of net flow) to be provided between the second intake manifold and the second exhaust manifold.

In an alternate embodiment, the controller may adjust valve timings by using a cam phaser on only one cam (either the intake or the exhaust) while adjusting the position of a shut-off valve coupled to the exhaust manifold. For example, the controller may shut off fuel to a bank and change the phasing of only one cam of the engine bank to create a condition of extreme negative valve overlap that effectively deactivates the bank. At the same time, the controller may shut flow out of the exhaust manifold of the inactive engine bank by closing the shut-off valve. In this way, cylinder deactivation is achieved. By using some cam timing adjustment and some shut-off valve adjustment, the exhaust manifold can be blown down to a pressure that is close to the intake manifold pressure, thereby reducing pumping work.

In yet another embodiment, the controller may move both the intake and the exhaust cams of a selected engine bank to increase negative valve overlap while the exhaust manifold is closed via the shut-off valve. This would provide for cam phasing cylinder deactivation (or VDE) without requiring cam to be moved in excess of 90 degrees.

As another example, the controller may operate a first group of cylinders on a first engine bank to combust and exhaust a larger amount of gas to a first catalyst and then to an exhaust junction at a first, higher flow rate; while operating a second group of cylinders on a second engine bank to not combust and alternate flow direction of a smaller amount of charge between a second catalyst and the exhaust junction at a second, lower flow rate. Herein, the second, lower flow rate is a fraction of the first, higher flow rate and alternating flow direction of the smaller amount of charge includes directing the smaller amount of charge at the second, lower flow rate from the exhaust junction to the second catalyst during a first condition, and directing the smaller amount of charge at the second, lower flow rate from the second catalyst to the exhaust junction during a second condition. The alternating of the flow direction may be based on an exhaust air-to-fuel ratio of the second group of cylinders relative to an exhaust air-to-fuel ratio of the first group of cylinders. For example, the alternating may include adjusting the valve timing of the second group of cylinders in a first direction when the exhaust air-to-fuel ratio of the second group of cylinders is leaner than an exhaust air-to-fuel ratio of the first group of cylinders, and adjusting the valve timing of the second group of cylinders in a second, opposite direction when the exhaust air-to-fuel ratio of the second group of cylinders is at or around the exhaust air-to-fuel ratio of the first group of cylinders.

As another example, the adjustment may include adjusting the valve timing to an initial timing where an exhaust air-to-fuel ratio of the second group of cylinders is within a threshold range of the exhaust air-to-fuel ratio of the first group of cylinders, and then readjusting the valve timing from the initial timing if the exhaust air-to-fuel ratio of the second group of cylinders is outside the threshold range of the exhaust air-to-fuel ratio of the first group of cylinders to return the exhaust air-to-fuel ratio of the first group of cylinders within the threshold range.

Now turning to FIG. 6, an example routine 600 is shown for adjusting intake and/or exhaust valve timings on a deactivated engine bank to provide a net reverse flow through the inactive bank relative to the active bank. The routine of FIG. 6 may be performed as part of the routine of FIG. 4, such as at 414.

At 602, the routine includes operating a first group of cylinders on a first engine bank to provide a net flow of air and exhaust gas from a first intake manifold to a first exhaust manifold. Operating the first group of cylinders includes injecting fuel to the first engine bank while adjusting a valve timing of intake and exhaust valves of the first group of cylinders to a first timing to provide a net flow of exhaust gas from the first intake manifold to the first exhaust manifold.

The controller may adjust the valve timing of intake and exhaust valves of the first group of cylinders to a first timing by adjusting a position of a first camshaft coupled to the first group of cylinders to a first position. The first timing may be based on estimated engine operating conditions (e.g., torque demand) as well as a desired exhaust air-to-fuel ratio. In some embodiments, the controller may also adjust a spark timing of the first group of cylinders based on a second valve timing of the second group of cylinders to maintain the desired exhaust air-to-fuel ratio and maintain a net brake torque. As an example, valve timing and fuel injection to the first group of cylinders may be adjusted to maintain an exhaust air-to-fuel ratio in the first engine bank substantially at or around stoichiometry.

At 604, the routine includes operating a second group of cylinders on a second engine bank to provide a net flow of exhaust gas from a second exhaust manifold to a second intake manifold. In one example, as shown at FIGS. 1-2, the first exhaust manifold may be coupled to the second exhaust manifold at a junction located downstream of a first exhaust catalyst of the first bank and a second exhaust catalyst of the second bank. Operating the second group of cylinders includes not injecting fuel to the second engine bank while adjusting a valve timing of intake and exhaust valves of the second group of cylinders to a second, different timing to provide a net flow of exhaust gas from the second exhaust manifold to the second intake manifold. That is, in an opposite direction to the direction of flow through the first group of cylinders of the first engine bank. The controller may adjust the valve timing of intake and exhaust valves of the second group of cylinders to a second timing by adjusting a position of a second camshaft coupled to the second group of cylinders to a second, different position.

As such, the second valve timing of the second group of cylinders enables exhaust to be drawn from the exhaust junction through a second exhaust catalyst of the second engine bank, into the engine intake. In other words, exhaust gas recirculation is enabled in the first engine bank via the second engine bank. In addition, since the exhaust gas is cooled during passage through the cylinders of the inactive engine bank, cooled EGR benefits are achieved. As such, during VDE operation, intake manifold pressure are typically high (that is, there is low vacuum) which can make it difficult to introduce EGR through conventional EGR methods (such as via an EGR passage). Herein, by using cam phasing adjustments to allow flow through the inactive engine bank to be reversed, cooled EGR can be pumped into the active engine bank even when there is minimal to no intake vacuum. That is, the window for EGR benefits is expanded during operation in the VDE mode.

Since combusted exhaust gas from the first engine bank is drawn into the second engine bank, it thus follows that the first exhaust air-to-fuel ratio of exhaust gases generated at the first engine bank should be detectable at the intake manifold of the second engine bank, as long as there is reverse flow through the second engine bank. In one example, a controller may confirm that the valve timing of the second group of cylinders is adjusted to a timing that enables reverse flow by sensing the first exhaust air-to-fuel ratio of the first group of cylinders at the exhaust manifold of the first engine bank (e.g., via a first exhaust air-to-fuel ratio sensor coupled to the exhaust manifold of the first engine bank) as well as at the intake manifold of the second engine bank (e.g., via a second intake air-to-fuel ratio sensor coupled to the intake manifold of the second engine bank).

As such, by virtue of the reverse flow wherein exhaust is delivered to the exhaust junction from the first engine bank and drawn from the exhaust junction into the second engine bank, changes in the exhaust air-to-fuel ratio of the first engine bank may affect the exhaust air-to-fuel ratio sensed at the second engine bank. In particular, as long as there is reverse flow through the second engine bank and as long as the valve timings of the second bank are at the desired settings enabling reverse flow, changes in the exhaust air-to-fuel ratio of the first engine bank will correlate with corresponding changes in the exhaust air-to-fuel ratio sensed at the intake of the second engine bank. For example, if there is a sudden and temporary enrichment of the first exhaust air-to-fuel ratio of the first engine bank, there may be a corresponding sudden and temporary enrichment of the second exhaust air-to-fuel ratio sensed at the intake of the second engine bank. In this case, no further valve timing adjustments of the second bank are required as it indicates that the flow through the second bank is being adjusted based on the flow through the first bank to maintain reverse flow through the second bank relative to the first bank.

If, however, there is no correlation between the exhaust air-to-fuel ratios, further valve timing adjustments may be required on the second engine bank. For example, if there is a sudden and temporary enrichment of the first exhaust air-to-fuel ratio of the first engine bank, but no corresponding enrichment of the second intake exhaust air-to-fuel ratio sensed at the intake of the second engine bank, valve timings of the second bank may need to be readjusted. The lack of correlation between the exhaust air-to-fuel ratios may indicate that the valve timings of the second engine bank have potentially deviated from the desired settings and flow through the second engine is not at the desired reverse flow. Valve timing readjustments are then performed so that flow through the second bank can be returned to a reverse flow through the second bank relative to the first bank.

In one example, the controller may operate the first group of cylinders on the first engine bank at an air-to-fuel ratio that is richer than stoichiometry for a duration until the richer than stoichiometry air-to-fuel ratio is sensed at an oxygen sensor in the second intake manifold of the second group of cylinders. Then, after the duration of running rich, the controller may resume operating the first group of cylinders at an air-to-fuel ratio that is at or around stoichiometry. In this way, reverse flow through the second engine bank is detected and better confirmed.

In an alternate embodiment, after the duration of running rich, the controller may operate the second group of cylinders on the second engine bank to provide no net flow of air or exhaust gas between the second intake manifold and the second exhaust manifold. For example, the controller may shift the second camshaft from the second position to a third position so as to adjust the valve timing of intake and exhaust valves of the second group of cylinders from the second timing to a third timing, while maintaining the first position of the first camshaft and the first timing of the intake and exhaust valves of the first group of cylinders.

As another example, a controller may confirm the reverse flow through the second engine bank by operating the first group of cylinders richer than stoichiometry for a duration until an air-to-fuel ratio sensed at the second intake manifold of the second engine bank is richer than a threshold level. For example, the first group of cylinders may continue to be enriched until the exhaust air-to-fuel ratio sensed at the second intake manifold of the second engine bank is within a range (e.g., within 10% of) the exhaust air-to-fuel ratio sensed at the exhaust manifold of the first engine bank. Herein, the enrichment may be based on the oxygen loading state of a second exhaust catalyst coupled to the second group of cylinders. For example, during a transition into VDE mode, the second catalyst downstream of the inactive second group of cylinders may be saturated with oxygen within 6 engine revolutions since the VCT system takes ~4-6 cycles to transition from normal flow to no flow (or reduced flow) conditions. While the second catalyst is loaded with oxygen, the enrichment of the exhaust of the first group of cylinders may not be sensed in the intake of the second group of cylinders. Once the fuel from the rich exhaust has displaced the oxygen from the second exhaust catalyst, the enrichment may be sensed in the second intake and catalyst regeneration may be determined. Then, the first group of cylinders may resume operation at stoichiometry. Herein, the rich exhaust gas is advantageously used to reduce the exhaust catalyst, thereby improving NOx conversion efficiency of the catalyst when the cylinders are reactivated.

As such, while flow of charge through the second engine bank is being directed in a direction that is opposite to the flow of charge through the first engine bank, the reverse flow can be advantageously used to identify exhaust leaks. FIG. 7 shows an example routine 700 that may be used to identify such exhaust leaks based on exhaust air-to-fuel ratio deviations. As such, the routine of FIG. 7 may be performed as part of the routine of FIG. 4, such as at 418. In the present example, a first group of cylinders on a first engine bank are the active cylinders while a second group of cylinders on a second engine bank are the inactive cylinders.

At 702, the routine includes sensing an air-to-fuel ratio at a location between an exhaust catalyst in the second exhaust manifold and the exhaust junction. That is, an exhaust air-to-fuel ratio sensed by a second exhaust air-to-fuel ratio sensor in the exhaust manifold of the inactive bank may be monitored. At 704, it may be determined if the sensed air-to-fuel ratio is leaner than a threshold. For example, it may be determined if the sensed air-to-fuel ratio is leaner than the expected air-to-fuel ratio. As such, the exhaust air-to-fuel ratio expected at the second exhaust manifold should be substantially the same as (e.g., with a range of, such as within 10% of) the exhaust air-to-fuel ratio sensed at the first exhaust manifold of the first engine bank because during the reverse flow, exhaust is drawn from the first exhaust manifold into the second exhaust manifold around the exhaust junction. However, if a leak is present in the exhaust manifold, air maybe unintentionally drawn in and mixed with the exhaust gas, leading to an enleanment of the exhaust air-to-fuel ratio.

If the monitored air-to-fuel ratio is not leaner than the threshold, then at 708, no exhaust leak may be determined. In comparison, at 706, the controller may indicate a post flange exhaust leak in the second engine bank responsive to the monitored air-to-fuel ratio being leaner than the threshold. In this way, an unexpected enleanment of exhaust air-to-fuel ratio sensed at the second group of cylinders, during a reverse flow through the second bank, can be advantageously used to identify exhaust leaks.

Now turning to FIG. 8, map 800 shows an example engine operation wherein flow through a deactivated engine bank is adjusted to provide a reduced flow in the same direction as charge flow through an active engine bank during some conditions, and to provide a reverse flow through the inactive bank in the opposite direction as charge flow through the active engine bank during other conditions.

Map 800 depicts changes in a first exhaust air-to-fuel ratio (AFR_Bank1) sensed at the first exhaust manifold of a first, combusting group of cylinders on a first, active engine bank at plot 802. Changes in a second exhaust air-to-fuel ratio (AFR_Bank2) sensed at the second intake manifold of a second, non-combusting group of cylinders on a second, inactive engine bank are depicted at plot 804. Plots 802 and 804 illustrate enrichment of an air-to-fuel ratio, relative to a baseline (803) representative of stoichiometry as you go above the baseline, and an enleanment as you go below the baseline. Changes to a flow (Flow_Bank2) of gases (air and/or exhaust gases) through the second, non-combusting group of cylinders on the second, inactive engine bank are depicted at plot 806. Valve timing adjustments (VVT_Bank2) to the second group of cylinders on the second, inactive engine bank are depicted at plot 808. Fueling adjustments (Fuel_Bank2) to the second group of cylinders on the second, inactive engine bank are depicted at plot 810. All changes are shown over time (along the x-axis).

Prior to t1, the engine may be operating in a non-VDE mode with all cylinders firing. That is, a first group of cylinders on a first engine bank as well as a second group of cylinders on a second engine bank may be combusting. Accordingly, fueling to both group of cylinders may be adjusted to provide an exhaust air-to-fuel ratio at a first exhaust manifold of the first engine bank and a second exhaust manifold of the second engine bank at or around stoichiometry 803 (the exhaust air-to-fuel ratio of the first group of cylinders is shown at plot 802). Fueling to the second group of cylinders is shown at plot 810 while a valve timing that enables air flow to the second group of cylinders is shown at plots 806 and 808. An air-to-fuel ratio sensed at the intake of the second engine bank may be leaner than stoichiometry 803 (plot 804) due a larger amount of intake air available at the intake manifold as compared to a corresponding exhaust manifold.

At t1, cylinder deactivation conditions may be confirmed and the engine may shift to operating in a VDE mode with the second group of cylinders selected for deactivation. Accordingly, fuel injection to the second group of cylinders may be deactivated (plot 810). In addition, a valve timing of the second group of cylinders may be adjusted (plot 808) to a timing to a timing that provides reduced flow of charge through the second group of cylinders (plot 806). That is, while fuel is injected to the first group of cylinders, a valve timing of the first group of cylinders (not shown) is maintained to provide a higher flow of charge through the first engine bank while fuel is not injected to the second group of cylinders, and a valve timing of the second group of cylinders is adjusted to provide a lower flow of charge through the second engine bank. As a result, the controller may operate the first group of cylinders on the first engine bank to combust and exhaust gas to a first catalyst and then to an exhaust junction at a first, higher flow rate while operating the second group of cylinders on the second engine bank to not combust and pump air to a second catalyst and then to the exhaust junction at a second, lower flow rate. The second, lower flow rate through the second group of cylinders may include substantially no flow, or may be a flow rate that is a fraction of the first, flow rate through the first group of cylinders (e.g., less than 10% of the flow rate through the first engine bank).

The controller may adjust the valve timing of the second group of cylinders based on an exhaust air-to-fuel ratio of the first group of cylinders to provide reduced flow through the second engine bank while also maintaining a desired exhaust air-to-fuel ratio at the second group of cylinders. For example, the controller may adjust the valve timing to an initial timing where an exhaust air-to-fuel ratio of the second group of cylinders is within a threshold range of the exhaust air-to-fuel ratio of the first group of cylinders (e.g., within +/−10% of the exhaust air-to-fuel ratio of the first group of cylinders). At this initial timing, a change in the exhaust air-to-fuel ratio of the first group of cylinders may correlate with a corresponding change in the exhaust air-to-fuel ratio sensed at the second group of cylinders. For example, as shown at region 811, a temporary enleanment of the exhaust air-to-fuel ratio of the second group of cylinders occurs (see plot 804 within region 811) due to a sudden increase in flow through the second group of cylinders (see plot 806 within region 811), the temporary enleanment responsive to a corresponding temporary enleanment of the exhaust air-to-fuel ratio of the first group of cylinders (see plot 802 within region 811). In other words, as long as both changes are proportional, the flow and exhaust air-to-fuel ratio of the second group of cylinders is within the threshold range of the flow and exhaust air-to-fuel ratio of the first group of cylinders. Consequently, no valve timing adjustments (see plot 808 within region 811) are required to address the temporary enleanment.

In comparison, if there is a change in the exhaust air-to-fuel ratio of the second group of cylinders that does not correlate with a corresponding change in the exhaust air-to-fuel ratio of the first group of cylinders (as a result of which the exhaust air-to-fuel ratio of the first group of cylinders falls outside the threshold range), the valve timing may need to be readjusted. As an example, the controller may readjust the valve timing from the initial timing if the exhaust air-to-fuel ratio of the second group of cylinders is outside the threshold range of the exhaust air-to-fuel ratio of the first group of cylinders to return the exhaust air-to-fuel ratio of the first group of cylinders within the threshold range.

One such example adjustment is shown at region 812 wherein a temporary enleanment of the exhaust air-to-fuel ratio of the second group of cylinders occurs (see plot 804 within region 812) due to a sudden increase in flow through the second group of cylinders (see plot 806 within region 812), even though there is no corresponding temporary enleanment of the exhaust air-to-fuel ratio of the first group of cylinders (see plot 802 within region 812). To address the uncorrelated temporary enleanment, the valve timing of the second group of cylinders is adjusted (in a first direction) to reduce flow through the second group of cylinders and return the exhaust air-to-fuel ratio within the threshold range.

Another example adjustment is shown at region 814 wherein a temporary enrichment of the exhaust air-to-fuel ratio of the second group of cylinders occurs (see plot 804 within region 814) due to a sudden decrease in flow through the second group of cylinders (see plot 806 within region 814), even though there is no corresponding temporary enrichment of the exhaust air-to-fuel ratio of the first group of cylinders (see plot 802 within region 814). To address the uncorrelated temporary enrichment, the valve timing of the second group of cylinders is adjusted (in a second direction that is opposite to the first direction of the adjustment in the preceding example) to increase flow through the second group of cylinders and return the exhaust air-to-fuel ratio within the threshold range.

As such, between t1 and t2, as air is pumped through the second group of cylinders, oxygen loading of a second exhaust catalyst in the exhaust manifold of the second engine bank may increase. This oxygen loading can decrease the performance of the catalyst and may require regeneration when the second group of cylinders is subsequently reactivated. Consequently, a high fuel penalty is incurred. To reduce the fuel penalty and improve catalyst performance on the inactive bank, at t2, the engine controller may readjust the valve timing of the second group of cylinders to reverse flow through the second engine bank. In the present example, reversal of flow direction is shown by change of plot 806 from one side of line 807 (representative of a given direction of flow) to the other side of line 807 (representative of an opposite direction of flow). That is, the valve timing of the second group of cylinders is adjusted so that exhaust gas (combusted and generated at the first group of cylinders) is drawn from the exhaust manifold of the first engine bank, through the exhaust junction, and then through the second exhaust catalyst into the intake manifold of the second engine bank. That is, exhaust from the first, active engine bank is recirculated via the second, inactive engine bank.

While reversing flow, the controller may also adjust the injection to the first group of cylinders to be richer than stoichiometry for a duration. The temporary enrichment of the first exhaust air-to-fuel ratio of the first group of cylinders may be based on an amount of oxygen loaded onto the second exhaust catalyst during the preceding operation with reduced flow. For example, the controller may estimate an amount of oxygen loaded onto the second exhaust catalyst between t1 and t2 based on the reduced air flow rate through the second group of cylinders as well as the air-to-fuel ratio of the second group of cylinders. As the oxygen loading increases, a degree of richness of the enrichment of the first group of cylinders (initiated at t2, as shown in plot 802) may be increased.

Between t2 and t3, the rich exhaust generated at the first group of cylinders may be drawn, around the exhaust junction (of the first and second engine banks), via the exhaust manifold of the second group of cylinders, into the engine intake. As the rich exhaust passes over and through the second exhaust catalyst of the second engine bank, oxygen is displaced from the second catalyst and replaced with fuel, thereby regenerating the catalyst. As long as the second catalyst is being regenerated via the rich exhaust gas, the richening of the first exhaust air-to-fuel ratio does not produce a corresponding richening of the air-to-fuel ratio sensed at the intake of the second group of cylinders (as shown at plots 802 and 804 between t2 to t3). In this way, reverse flow or recirculation of rich exhaust gas from an active engine bank to an inactive engine bank, via an exhaust catalyst of the inactive engine bank, allows the catalyst to be at least partially regenerated. This reduces the fuel penalty that would have otherwise been incurred during subsequent reactivation of the inactive engine bank.

Once the second exhaust catalyst is regenerated, the richening of the first exhaust air-to-fuel ratio produces a corresponding richening of the air-to-fuel ratio sensed at the intake of the second group of cylinders (as shown at plots 802 and 804 from t3 to t4). At t3, upon detecting the rich air-to-fuel ratio of the second engine bank at the intake of the first engine bank, the controller determines that second catalyst regeneration has been completed and the enrichment of the first exhaust air-to-fuel ratio is discontinued. The exhaust air-to-fuel ratio of the first group of cylinders is then returned to being at or around stoichiometry (see plot 802 after t3).

At t4, cylinder reactivation conditions may be met. Accordingly, at t4, fuel injection to the second group of cylinders may be resumed (plot 810), and valve timing for the second group of cylinders may be readjusted (plot 808) to allow higher flow of charge through the second bank (plot 806), in the first direction from the intake to the exhaust. The changes in fueling and air flow to the second engine bank may be adjusted to operate the second group of cylinders at an exhaust air-to-fuel ratio that is substantially at stoichiometry 803 (plot 804). Herein, by regenerating the second catalyst while the second engine bank is deactivated, additional regeneration required upon cylinder reactivation may be reduced. In one example, the catalyst on the inactive engine bank may be partially regenerated during the cylinder deactivation cycle, the regeneration completed during the subsequent reactivation cycle. By reducing regeneration requirements, fuel economy is improved.

Figure 9:
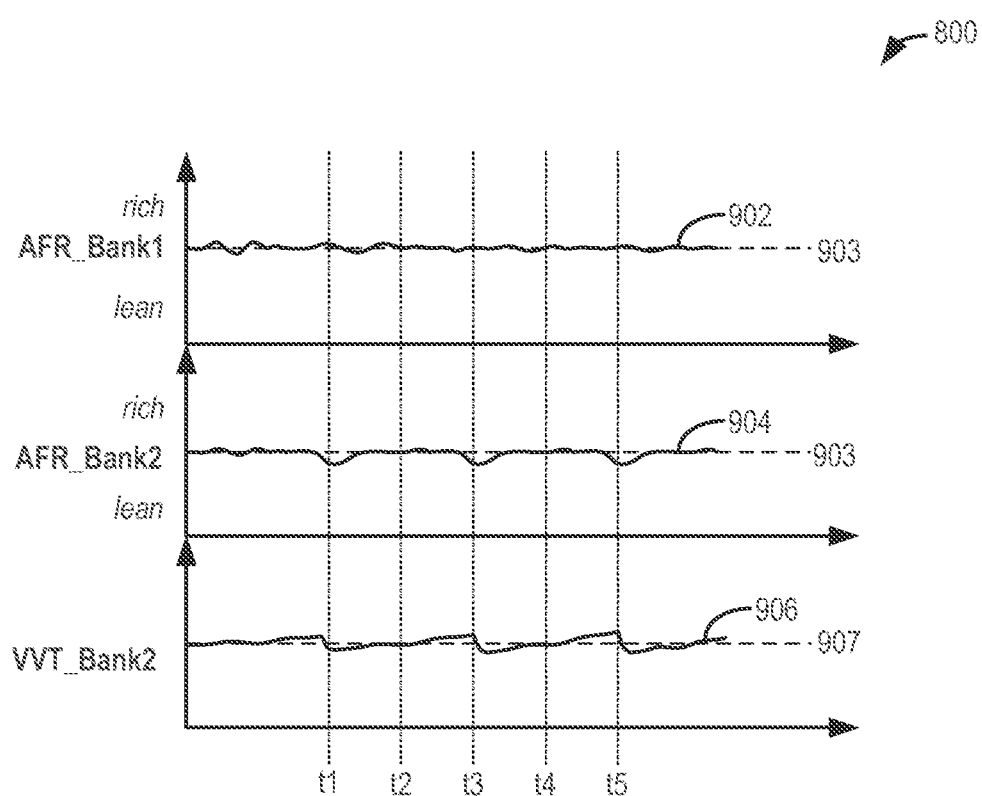
FIG. 9 illustrates an example valve timing adjustment to the second group of cylinders to provide substantially zero flow through the second bank.

Now turning to FIG. 9, map 900 shows an example engine operation wherein valve timing adjustments are continually performed based on an exhaust air-to-fuel ratio of a deactivated engine bank to provide substantially zero flow through the inactive engine bank.

Map 900 depicts changes in a first exhaust air-to-fuel ratio (AFR_Bank1) sensed at the first exhaust manifold of a first, combusting group of cylinders on a first, active engine bank at plot 902. Changes in a second exhaust air-to-fuel ratio (AFR_Bank2) sensed at the second exhaust manifold of a second, non-combusting group of cylinders on a second, inactive engine bank are depicted at plot 904. Plots 902 and 904 illustrate enrichment of an air-to-fuel ratio, relative to a baseline (903) representative of stoichiometry as you go above the baseline, and an enleanment as you go below the baseline. Valve timing adjustments (VVT_Bank2) to the second group of cylinders on the second, inactive engine bank are depicted at plot 906. All changes are shown over time (along the x-axis).

In the depicted example, the engine may be operating in a VDE mode with one or more cylinders deactivated. In particular, the engine may be operating with a first group of cylinders on a first, active engine bank combusting fuel and with a second group of cylinders on a second, inactive engine bank not combusting fuel. A valve timing of the first group of cylinders (not shown) may be adjusted so that an exhaust air-to-fuel ratio sensed at the first engine bank (plot 902) is substantially at or around stoichiometry 903. At the same time, a valve timing of the second group of cylinders (plot 906) may be continuously adjusted based on the exhaust air-to-fuel ratio sensed at the second engine bank (plot 904). In particular, the exhaust air-to-fuel ratio sensed at the second engine bank is used to infer a direction of flow through the second engine bank, and accordingly, a valve timing adjustment is made to adjust the direction of flow so that substantially zero flow is provided at the second bank.

For example, at each of time points t1, t3, and t5, a leaner than stoichiometric exhaust air-to-fuel ratio is sensed at the second engine bank. Based on the sensed lean air-to-fuel ratio, the controller may infer that there is a net flow of some fresh air from the intake manifold to the exhaust manifold of the second engine bank. Accordingly, at each of t1, t3, and t5, the controller may adjust the valve timing to reduce and/or reverse flow through the second engine bank. The reversal of flow allows the air-to-fuel ratio of the second bank to be returned to stoichiometry.

As another example, at each of time points t2 and t4, a stoichiometric exhaust air-to-fuel ratio is sensed at the second engine bank. Based on the sensed stochiometric air-to-fuel ratio, the controller may infer that there may be a net flow (or no flow) of some charge from the exhaust manifold to the intake manifold of the second engine bank. Accordingly, at each of t2, and t4, the controller may adjust the valve timing to reduce and/or reverse flow through the second engine bank. The reversal of flow allows the air-to-fuel ratio of the second bank to be moved towards being slightly leaner than stoichiometry. The controller may then allow the valve timing adjustment to continue until a leaner than stoichiometry exhaust air-to-fuel ratio is sensed, at which time the valve timing is adjusted again (but in an opposite direction) to reverse a direction of flow through the second engine bank.

In this way, by continuously adjusting the valve timing, a flow direction through an inactive engine bank can be alternated to essentially maintain zero net flow through the bank. By reducing forward flow from the intake manifold to the exhaust manifold of the inactive engine bank, catalyst oxygen saturation is reduced, thereby reducing regeneration requirements of the catalyst.

In one example, an engine system comprises a first engine bank having a first group of cylinders, a first intake manifold, a first exhaust manifold, and a first exhaust catalyst in the first exhaust manifold, and a second engine bank having a second group of cylinders, a second intake manifold, a second exhaust manifold, and a second exhaust catalyst in the second exhaust manifold. The second exhaust manifold is coupled to the first exhaust manifold downstream of a junction, and the second intake manifold is coupled to the first intake manifold upstream of a branch point. The engine system further comprises a first camshaft coupled to the first engine bank and configured to adjust an intake and/or exhaust valve timing of the first group of cylinders, as well as a second camshaft coupled to the second engine bank and configured to adjust the intake and/or exhaust valve timing of the second group of cylinders.

The engine system additionally includes a controller with computer readable instructions for, injecting fuel to, while adjusting a valve timing of, the first group of cylinders based on an exhaust air-to-fuel ratio of the first exhaust manifold to provide a higher flow of air and exhaust gas from the first intake manifold to the first exhaust manifold. The controller includes further instructions for not injecting fuel to, while adjusting a valve timing of the second group of cylinders based on an exhaust air-to-fuel ratio of the second exhaust manifold to provide substantially lower flow from the second intake manifold to the second exhaust manifold. The valve timing of the first group of cylinders is adjusted to maintain the exhaust air-to-fuel ratio of the first exhaust manifold at or around stoichiometry, while the valve timing of the second group of cylinders is adjusted to maintain the exhaust air-to-fuel ratio of the second exhaust manifold slightly leaner than stoichiometry.

The controller can also adjust a spark timing of the first group of cylinders based on the valve timing of the second group of cylinders to maintain a net brake torque and also to maintain the exhaust air-to-fuel ratio of the first exhaust manifold at or around stoichiometry. After operating the second group of cylinders with the substantially zero flow for a duration, the controller further adjusts the valve timing of the second group of cylinders based on an intake air-to-fuel ratio of the second intake manifold to draw exhaust gas from the first exhaust manifold into the second intake manifold via the second exhaust manifold.

In another example, the controller is configured with instructions for injecting fuel to, while adjusting a valve timing of, the first group of cylinders to provide a net flow of air and exhaust gas from the first intake manifold to the first exhaust manifold. Alongside, the controller may not injecting fuel to, while adjusting a valve timing of, the second group of cylinders to recirculate exhaust gas from the first exhaust manifold to the first intake manifold via the second exhaust manifold and the second intake manifold. In particular, the controller may adjust the first camshaft to a first position to operate the intake and exhaust valves of the first group at a first timing, while adjusting the second camshaft to a second, different position to operate the intake and exhaust valves of the second group at a second, different timing. In addition, while recirculating exhaust gas, the controller may indicate an exhaust leak in the second engine bank responsive to an air-to-fuel ratio sensed at the second exhaust catalyst being leaner than a threshold level.

In this way, cam phasing can be used to selectively deactivate a group of cylinders during a VDE mode of operation. By adjusting a valve timing of an inactive engine bank based on an exhaust air-to-fuel ratio sensed at the inactive bank, flow through an exhaust catalyst can be reduced and substantially zero flow through the inactive bank can be provided. In particular, by continuously adjusting the valve timing based on the exhaust air-to-fuel ratio sensed at the inactive engine bank, pumping of fresh intake air from the intake manifold to the exhaust manifold of the inactive bank can be reduced, thereby reducing oxygen saturation of the catalyst. By adjusting the valve timing during other conditions to reverse flow through the inactive engine bank, cooled EGR benefits can be provided in addition to VDE benefits, even during low intake vacuum conditions. By enriching the exhaust gas recirculated via the inactive engine bank, an exhaust catalyst can also be at least partially regenerated. By reducing catalyst regeneration requirements during cylinder reactivation, catalyst efficiency on the inactive bank can be improved, tailpipe emissions can be reduced, and fuel economy can be improved.

As will be appreciated by one of ordinary skill in the art, routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine method, comprising:
   operating a first group of cylinders on a first engine bank to provide a net flow of air and exhaust gas from a first branched intake manifold to a first exhaust manifold while operating a second group of cylinders on a second engine bank to provide a net flow of exhaust gas from a second exhaust manifold to a second branched intake manifold; and
   indicating a leak in the second exhaust manifold in response to an air-to-fuel ratio sensed at the second exhaust manifold being leaner than a threshold level.

2. The method of claim 1, wherein the first exhaust manifold is coupled to the second exhaust manifold at a junction located downstream of a first exhaust catalyst of the first bank and a second exhaust catalyst of the second bank.

3. The method of claim 2, wherein operating the first group of cylinders includes injecting fuel to the first engine bank while adjusting a valve timing of intake and exhaust valves of the first group of cylinders to a first timing to provide a net flow of exhaust gas from the first branched intake manifold to the first exhaust manifold, and wherein operating the second group of cylinders includes not injecting fuel to the second engine bank while adjusting a valve timing of intake and exhaust valves of the second group of cylinders to a second, different timing to provide a net flow of exhaust gas from the second exhaust manifold to the second intake manifold.

4. The method of claim 3, wherein adjusting the valve timing of intake and exhaust valves of the first group of cylinders to a first timing includes adjusting a position of a first camshaft coupled to the first group of cylinders to a first position, and wherein adjusting the valve timing of intake and exhaust valves of the second group of cylinders to a second timing includes adjusting a position of a second camshaft coupled to the second group of cylinders to a second, different position.

5. The method of claim 4, further comprising adjusting a spark timing of the first group of cylinders based on the second valve timing of the second group of cylinders.

6. The method of claim 5, wherein operating the first group of cylinders on the first engine bank includes operating the first group of cylinders at an air-to-fuel ratio that is richer than stoichiometry for a duration until the richer than stoichiometry air-to-fuel ratio is sensed at an oxygen sensor in the second intake manifold of the second group of cylinders.

7. The method of claim 6, further comprising, after the duration, operating the first group of cylinders at an air-to-fuel ratio that is at or around stoichiometry.

8. The method of claim 6, further comprising, after the duration, operating the second group of cylinders on the second engine bank to provide no net flow of air or exhaust gas between the second intake manifold and the second exhaust manifold.

9. The method of claim 8, wherein operating the second group of cylinders to provide no net flow includes shifting the second camshaft from the second position to a third position so as to adjust the valve timing of intake and exhaust valves of the second group of cylinders from the second timing to a third timing, while maintaining the first position of the first camshaft and the first timing of the intake and exhaust valves of the first group of cylinders.

10. The method of claim 2, wherein the air-to-fuel ratio sensed at the second exhaust manifold includes the air-to-fuel ratio sensed between the second exhaust catalyst and the junction, and wherein indicating the leak includes indicating a post flange exhaust leak in the second exhaust manifold.

11. A method, comprising:
    operating a first cylinder group on a first engine bank to flow charge in a first direction towards a first exhaust manifold;
    operating a second cylinder group on a second engine bank to flow charge in a second, opposite direction from a second exhaust manifold; and
    indicating an exhaust leak in the second engine bank responsive to air-fuel ratio monitored downstream of the second exhaust manifold being leaner than a threshold.

12. The method of claim 11, wherein the first direction of charge flow includes flowing charge from a first intake manifold towards the first exhaust manifold of the first engine bank, and wherein the second direction of charge flow includes flowing charge from the second exhaust manifold towards a second intake manifold of the second engine bank.

13. The method of claim 12, wherein operating the second cylinder group to flow charge in the second direction occurs during a first condition when EGR requested in the first cylinder group is higher than a threshold level, the method further comprising, during a second condition, operating the second cylinder group to provide no net flow through the second engine bank, the second condition including EGR requested in the first cylinder group being lower than the threshold level.

14. The method of claim 13, wherein the first condition further includes cooled EGR requested in the first cylinder group and the second condition includes no cooled EGR requested in the first cylinder group.

15. The method of claim 13, wherein the first condition further includes the second group of cylinders having been operated with no net flow for a duration.

16. The method of claim 13, wherein during the first condition, the first group of cylinders are operated richer than stoichiometry for a duration until an air-to-fuel ratio sensed at the second intake manifold of the second engine bank is richer than a threshold level.

17. The method of claim 12, wherein the second exhaust manifold is coupled to the first exhaust manifold downstream of a junction, and wherein the indicating includes,
    during the first condition,
    sensing the air-to-fuel ratio at a location between an exhaust catalyst in the second exhaust manifold and the junction; and
    indicating a post flange exhaust leak.

18. An engine method, comprising:
    operating a first group of cylinders on a first engine bank to combust and exhaust gas to a catalyst and then to an exhaust junction while operating a second group of cylinders on a second engine bank to draw gas from the exhaust junction, through a second catalyst, and then to an intake; and adjusting an amount of gas recirculated on the first engine bank via an EGR passage based on an amount of gas drawn from the exhaust junction through the second catalyst of the second engine bank.

19. The method of claim 18, wherein an intake of the second engine bank is the same as or different from the intake of the first engine bank.

20. The method of claim 18, wherein the EGR passage is coupled between the intake and upstream of the exhaust junction.

* * * * *